(12) United States Patent
Dale et al.

(10) Patent No.: US 11,993,096 B2
(45) Date of Patent: May 28, 2024

(54) ARRAY OF PRINTED INFORMATION SHEETS FOR A BUSINESS ESTABLISHMENT

(71) Applicant: Avery Dennison Retail Information Services LLC, Mentor, OH (US)

(72) Inventors: Ernest James Dale, Waterford, VA (US); James Fernando Jiron, Smithsburg, MD (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 63 days.

(21) Appl. No.: 17/805,295

(22) Filed: Jun. 3, 2022

(65) Prior Publication Data
US 2022/0288962 A1 Sep. 15, 2022

Related U.S. Application Data

(60) Division of application No. 17/012,288, filed on Sep. 4, 2020, now Pat. No. 11,390,106, which is a
(Continued)

(51) Int. Cl.
| | |
|---|---|
| *B42D 12/00* | (2006.01) |
| *B31D 1/02* | (2006.01) |
| *B42B 5/12* | (2006.01) |
| *B42D 5/00* | (2006.01) |
| *B42D 5/02* | (2006.01) |

(Continued)

(52) U.S. Cl.
CPC .............. *B42D 12/00* (2013.01); *B31D 1/021* (2013.01); *B42B 5/12* (2013.01); *B42D 5/00* (2013.01); *B42D 5/02* (2013.01); *B42D 15/00* (2013.01); *B42F 13/16* (2013.01); *G06Q 10/06* (2013.01); *G06Q 10/087* (2013.01)

(58) Field of Classification Search
CPC ....................................................... B42D 5/02
See application file for complete search history.

(56) References Cited

U.S. PATENT DOCUMENTS

| | | |
|---|---|---|
| 3,767,039 A | 10/1973 | Schroter |
| 4,188,250 A | 2/1980 | Grass |

(Continued)

FOREIGN PATENT DOCUMENTS

| | | |
|---|---|---|
| WO | 02/100655 | 12/2002 |
| WO | 2015/112615 | 7/2015 |
| WO | 2015/112620 | 7/2015 |

*Primary Examiner* — Eliyah S. Harper

(57) ABSTRACT

In some embodiments, an array of printed information sheets to be placed in a business establishment may include at least two stacks of printed information sheets being detachably connected to each other. Each stack of printed information sheets may include at least a first multiple product information sheet and a second information sheet that are removably attached to each other or to the stack. The first multiple product information sheet may have printed thereon first product information about a first product to be displayed in the business establishment and a first location indicator indicating a first predetermined location in the business establishment where the first multiple product information sheet is to be displayed. The second multiple product information sheet may have printed thereon second product information and a second location indicator.

10 Claims, 12 Drawing Sheets

Related U.S. Application Data continuation of application No. 14/606,643, filed on Jan. 27, 2015, now Pat. No. 10,800,200.

(51) Int. Cl.
  *B42D 15/00* (2006.01)
  *B42F 13/16* (2006.01)
  *G06Q 10/06* (2023.01)
  *G06Q 10/087* (2023.01)

(56) References Cited

U.S. PATENT DOCUMENTS

| | | | |
|---|---|---|---|
| 5,948,494 | A | 9/1999 | Levin |
| 6,269,342 | B1 | 7/2001 | Brick et al. |
| 6,921,453 | B2 | 7/2005 | Droznek, Jr. et al. |
| 7,287,001 | B1 * | 10/2007 | Falls .................... G06Q 20/202 705/28 |
| 7,533,036 | B2 * | 5/2009 | Bamberg ........... G06Q 30/0204 705/28 |
| 8,261,477 | B1 | 9/2012 | Wilkinson et al. |
| 8,273,436 | B2 | 9/2012 | Flynn |
| 8,626,613 | B2 | 1/2014 | Dale et al. |
| 8,836,990 | B1 | 9/2014 | Dale et al. |
| 8,885,204 | B1 * | 11/2014 | Dale ...................... B42C 19/04 705/28 |
| D720,002 | S | 12/2014 | Weidauer et al. |
| D720,003 | S | 12/2014 | Weidauer et al. |
| 8,970,893 | B1 | 3/2015 | Dale et al. |
| 9,376,286 | B1 | 6/2016 | Browning et al. |
| 9,613,547 | B2 | 4/2017 | Weiner et al. |
| 9,928,531 | B2 * | 3/2018 | McCarthy ........... G06Q 30/0617 |
| 10,710,762 | B1 * | 7/2020 | Dronzek, Jr. ............. B32B 7/06 |
| 2001/0045893 | A1 * | 11/2001 | Swartzel ................. G06K 17/00 340/572.1 |
| 2003/0154141 | A1 * | 8/2003 | Capazario ............ G06Q 10/087 705/26.1 |
| 2004/0135364 | A1 | 7/2004 | Dale et al. |
| 2005/0021561 | A1 * | 1/2005 | Noonan .................. G06Q 30/06 |
| 2006/0017278 | A1 | 1/2006 | Wood |
| 2007/0120360 | A1 | 5/2007 | Busam et al. |
| 2007/0164554 | A1 | 7/2007 | Krone et al. |
| 2008/0095963 | A1 | 4/2008 | Robbins |
| 2008/0095964 | A1 | 4/2008 | Wilkinson et al. |
| 2008/0255894 | A1 | 10/2008 | Falls et al. |
| 2009/0043676 | A1 * | 2/2009 | Riley .................. G06Q 30/0264 705/26.1 |
| 2009/0234668 | A1 * | 9/2009 | Wheeler ............ G06Q 30/0281 705/346 |
| 2010/0212195 | A1 | 8/2010 | Nunez et al. |
| 2011/0066458 | A1 | 3/2011 | Dale et al. |
| 2011/0283578 | A1 | 11/2011 | Engelby et al. |
| 2013/0144757 | A1 | 6/2013 | Bauer et al. |
| 2013/0173435 | A1 | 7/2013 | Cozad, Jr. |
| 2014/0366413 | A1 | 12/2014 | Weidauer et al. |
| 2014/0366414 | A1 | 12/2014 | Weidauer et al. |
| 2014/0367017 | A1 | 12/2014 | Blackwell et al. |
| 2014/0367034 | A1 | 12/2014 | Weidauer et al. |
| 2014/0367471 | A1 | 12/2014 | Weidauer et al. |
| 2014/0367472 | A1 | 12/2014 | Weidauer et al. |
| 2014/0367956 | A1 | 12/2014 | Wilkinson et al. |
| 2015/0000819 | A1 | 1/2015 | Blackwell et al. |
| 2015/0043016 | A1 * | 2/2015 | Randall ................ G06Q 10/087 283/79 |
| 2015/0202907 | A1 | 7/2015 | Dale et al. |
| 2015/0365660 | A1 * | 12/2015 | Wu ....................... G05D 1/0234 348/188 |
| 2016/0110633 | A1 * | 4/2016 | Moore ................... G06V 20/80 348/207.2 |
| 2016/0180533 | A1 * | 6/2016 | Pavani ..................... G06T 7/74 382/103 |
| 2016/0185557 | A1 * | 6/2016 | Herrmann .......... B65H 31/3081 270/58.23 |
| 2016/0202907 | A1 | 7/2016 | Kanno et al. |
| 2020/0050813 | A1 * | 2/2020 | Bonner ................... G06F 9/542 |

* cited by examiner

50

---

52      Obtain planogram information for a set of products for display in a business establishment

↓

54      Apportion the set of products to a set of printed information sheets to be placed in the business establishment

↓

56      Print the set of printed information sheets, where printed information sheet comprises information about product(s) and location indicator that indicates predetermined location in the business establishment where the product is to be displayed

↓

58      Bind the set of printed information sheets in an order based on the location indicator information printed on the printed information sheets

| 72 | Provide an array of printed information sheets to a worker in a business establishment |

| 74 | Detach a first stack having a plurality of printed information sheets from the array |

| 76 | Attach printed information sheets of the first stack to their corresponding structures in the business establishment |

| 78 | Responsive to all printed information sheets being removed from first stack and attached to their corresponding structures, detach a second stack having a plurality of printed information sheets from the array |

| 80 | Attach printed information sheets of the second stack to their corresponding structures in the business establishment |

FIG. 7

ARRAY OF PRINTED INFORMATION SHEETS FOR A BUSINESS ESTABLISHMENT

RELATED APPLICATION DATA

The present application is a division of U.S. patent application Ser. No. 17/012,288 filed Sep. 4, 2020, which is a continuation of U.S. patent application Ser. No. 14/606,643, filed Jan. 27, 2015, both of which are incorporated herein by reference in their entireties.

FIELD OF THE INVENTION

The disclosure relates to an array of printed information sheets to be placed in a business establishment, where the array includes at least two stacks of printed information sheets being detachably connected to each other and each stack of printed information sheets includes at least a first multiple product information sheet and a second information sheet and to methods for producing the array of printed information sheets.

BACKGROUND

Generally speaking, business establishments or stores use product strips, labels, indicia, etc. ("labels") to provide information related to products available in the store, and to attract attention to those products. A product label may provide information related to price, sale price, Universal Product Code (UPC), product description, weight, and/or other product information for a product on display for sale at a store.

Conventional product labels may exist, but have various limitations and drawbacks. For example, conventional systems may produce a set of product labels for a store employee to place in the store. Store employees may have to consult planogram data and/or other plans to determine where to place the product labels in the store. Even if the product labels are provided to the store employee in a predetermined order, the product labels themselves may be disposed on separate sheets that may be delivered to a store with a fastener, such as a tie, rubber band, plastic band, and/or other fastener holding the labels together. These fasteners may fail to maintain the order of the labels during shipment, placement, and/or other handling of the labels. For example, a fastener holding the labels together may break during shipment of the labels, during placement of a label, and/or at another time. In another example, after an employee removes the fastener in order to begin placing the labels, the order of the labels may be unintentionally altered. These and other drawbacks exist.

SUMMARY

According to an embodiment, an array of printed information sheets to be placed in a business establishment is provided. The array of printed information sheets may include at least two stacks of printed information sheets, in which the stacks are detachably connected to each other. Each stack of printed information sheets may include at least a first printed information sheet and a second printed information sheet that are removably attached to each other. The first printed information sheet may have printed thereon first product information about a first product to be displayed in the business establishment and a first location indicator indicating a first predetermined location in the business establishment where the first printed information sheet is to be displayed. The second printed information sheet may have printed thereon second product information about a second product to be displayed in the business establishment and a second location indicator indicating a second predetermined location in the business establishment where the second printed information sheet is to be displayed.

According to another embodiment, an array of printed information sheets to be placed in a business establishment is provided. The array of printed information sheets may include at least two stacks of printed information sheets, in which the stacks are detachably connected to each other. Each stack of printed information sheets may include at least a first printed information sheet and a second printed information sheet that are attached to the stack. The first printed information sheet may have printed thereon first product information about a first product to be displayed in the business establishment and a first location indicator indicating a first predetermined location in the business establishment where the first printed information sheet is to be displayed. The second printed information sheet may have printed thereon second product information about a second product to be displayed in the business establishment and a second location indicator indicating a second predetermined location in the business establishment where the second printed information sheet is to be displayed.

According to yet another embodiment, a computer-implemented method (which may also include manual processing after the printing and binding procedures) for producing an array of printed information sheets to be placed in a business establishment is provided. The method can be implemented in a computer system comprising one or more physical processors and one or more printers. The method may include accessing, by the one or more physical processors, planogram information for a set of products for display in the business establishment, wherein the planogram information comprises information identifying a set of products for display and information identifying a corresponding set of locations in the business establishment at which the respective set of products are to be displayed; apportioning, by the one or more physical processors, the set of products to a set of information sheets, wherein each information sheet is associated with at least a product; printing, by the one or more printers, at least first product information about a first product to be displayed in the business establishment and a first location indicator indicating a first predetermined location in the business establishment where the first printed information sheet (or product) is to be displayed on a first information sheet, thereby producing at least a first printed information sheet, at least third product information about a third product to be displayed in the business establishment and a third location indicator indicating a third predetermined location in the business establishment where the third printed information sheet (or product) is to be displayed on a third information sheet, thereby producing at least a third printed information sheet, wherein the at least first printed information sheet and the at least third printed information sheet form a first multiple product information sheet; printing, by the one or more printers, at least second product information about a second product to be displayed in the business establishment and a second location indicator indicating a second predetermined location in the business establishment where the second printed information sheet (or product) is to be displayed on a second information sheet, thereby producing at least a second printed information sheet, and at least fourth product information about a fourth product to be displayed in the business establishment and a fourth location indicator indicating a fourth predetermined location in the business establishment where the fourth printed information sheet (or product) is to be displayed on a fourth information sheet, thereby producing at least a fourth printed information sheet, wherein the at least second printed information sheet and the at least fourth printed information sheet form a second multiple product information sheet; and binding the first and the second multiple product information sheets to produce the array of the printed information sheets.

The method is carried out such that the first printed information sheet is detachably connected to the third printed information sheet on the first multiple product information sheet, and the second printed information sheet is detachably connected to the fourth printed information sheet on the second multiple product information sheet. In one embodiment, the second predetermined location may be immediately adjacent to the first predetermined location in the business establishment, and the fourth predetermined location may be immediately adjacent to the third predetermined location in the business establishment. In another embodiment, the first and second multiple product information sheets are bound in such a manner that the first multiple product information sheet is positioned above the second printed information sheet, and the third printed information sheet is positioned above the fourth printed information sheet.

According to yet another embodiment, a computer-implemented method for producing an array of printed information sheets to be placed in a business establishment is provided. The method can be implemented in a computer system comprising one or more physical processors and one or more printers. The method may include accessing, by the one or more physical processors, planogram information for a set of products for display in the business establishment, wherein the planogram information comprises information identifying the set of products for display and information identifying a corresponding set of locations in the business establishment at which the respective set of products are to be displayed; apportioning, by the one or more physical processors, the set of products to a set of information sheets, wherein each information sheet is associated with at least a product; printing, by the one or more printers, at least first product information about a first product to be displayed in the business establishment and a first location indicator indicating a first predetermined location in the business establishment where the first product is to be displayed on a first information sheet, thereby producing at least a first printed information sheet, at least second product information about a second product to be displayed in the business establishment and a second location indicator indicating a second predetermined location in the business establishment where the second product is to be displayed on a second information sheet, thereby producing at least a second printed information sheet, at least third product information about a third product to be displayed in the business establishment and a third location indicator indicating a third predetermined location in the business establishment where the third product is to be displayed on a third information sheet, thereby producing at least a third printed information sheet; and at least fourth product information about a fourth product to be displayed in the business establishment and a fourth location indicator indicating a fourth predetermined location in the business establishment where the fourth product is to be displayed on a fourth information sheet, thereby producing at least a fourth printed information sheet, binding the first and second printed information sheets to form a first stack of an array and binding the third and fourth printed information sheets to form a second stack of an array, and detachably connecting the first stack to the second stack to form the array. In one embodiment, the second predetermined location is immediately adjacent to the first predetermined location in the business establishment, and the fourth predetermined location is immediately adjacent to the third predetermined location in the business establishment.

These and other aspects, features, and characteristics of the present disclosure, as well as the functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIGS. 5 and 6 illustrate flow charts of exemplary methods of producing an array of printed information sheets, according to aspects of the disclosure; and FIG. 7 illustrates a flow chart of an exemplary method followed by a worker to place the printed information sheets in the business establishment, according to an aspect of the disclosure.

DETAILED DESCRIPTION

Figure 1A:
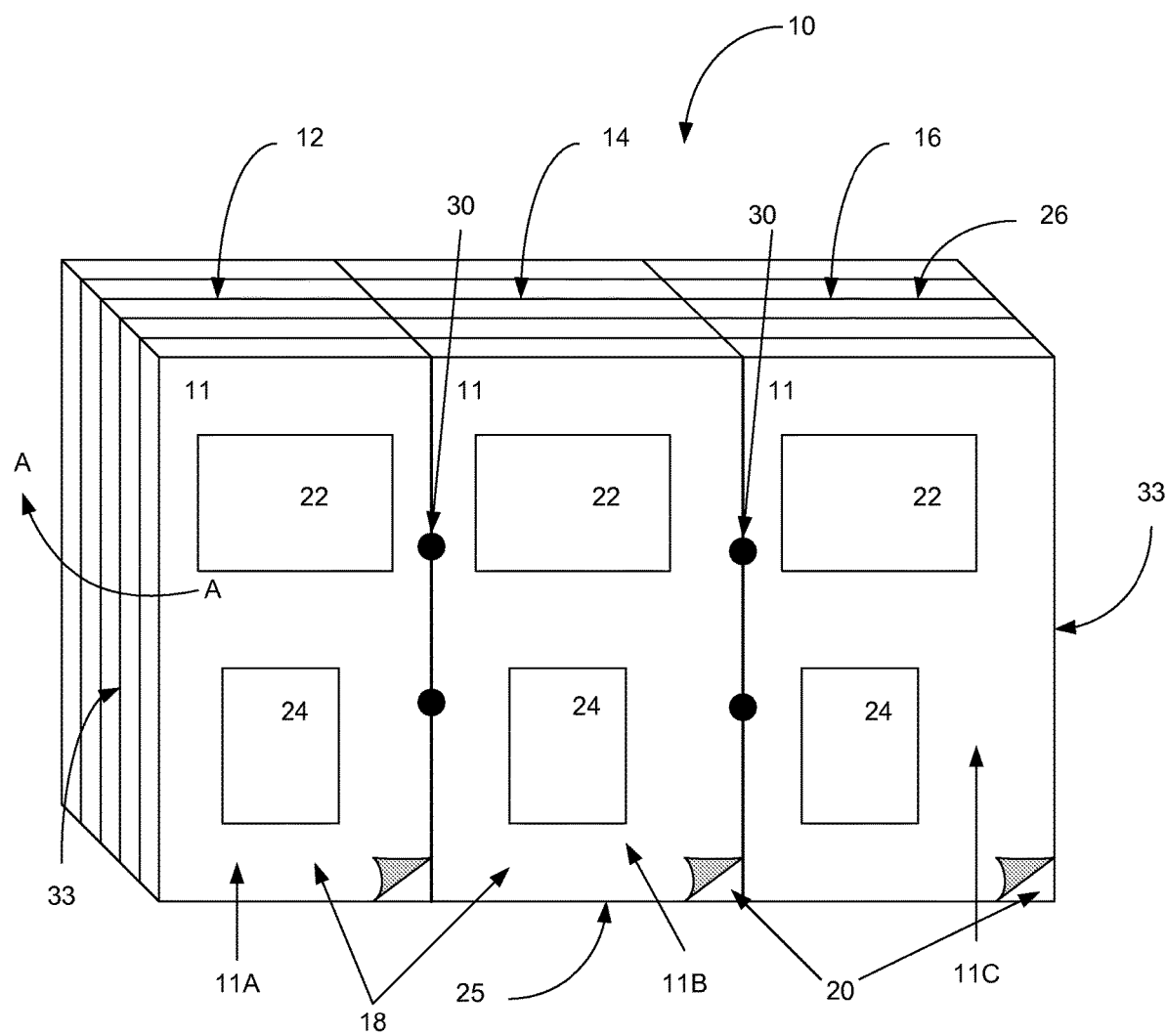
FIGS. 1A-1B illustrate exemplary arrays of printed information sheets to be placed in a business establishment, according to aspects of the disclosure.

FIG. 1A illustrates exemplary array 10 of printed information sheets 11 to be placed in a business establishment. The array 10 includes at least two stacks 12, 14, 16 (three stacks are shown in the FIGS) of printed information sheets 11 that are detachably connected to each other (three printed information sheets 11 are shown in FIG. 1A). Each stack 12, 14, 16 of printed information sheets 11 includes at least a first multiple product information sheet 18 and a second multiple product information sheet 20 that are bound to one another, preferably at the upper edge 26, although they also could be bound to one another at a lower edge 25. First multiple product information sheet 18 and second multiple product information sheet can be bound in such a manner that the each printed information sheet in the first multiple product information sheet 18 can be removed or easily detached from the immediately adjacent printed information sheet in the second multiple product information sheet 20. As will be clear from the discussions below with respect to FIGS. 2A-2E, in some embodiments, the first multiple product information sheet 18 preferably is bound to the adjacent, second multiple product information sheet 20.

The first multiple product information sheet 18 may include at least two adjacent printed information sheets 11 in which each printed information sheet 11 has printed thereon first product information 22 about a first product to be displayed in the business establishment and a first location indicator 24 indicating a first predetermined location in the business establishment where the first printed information sheet 11 and/or the first product are to be displayed. The second multiple product information sheet 20 also may include at least two adjacent printed information sheets 11 in which each printed information sheet 11 has printed thereon second product information 22 about a second product to be displayed in the business establishment and a second location indicator 24 indicating a second predetermined location in the business establishment where the second printed information sheet 11 and/or the second product are to be displayed. It is to be understood throughout this disclosure that the respective products (i.e., first, second, third, fourth, etc.) may be the same or different, may be products or services, and that the respective location indicators may be the same or different. Typically, the first product information 22 and first location indicator 24 on the first multiple product information sheet 11 will be different from the second product information 22 and second location indicator 24 on an adjacent information sheet 11, although the same product information could be associated with more than one location indicator, or different product information may be associated with the same location indicator.

According to an aspect of the disclosure, the business establishment may be selected from the group consisting of: a single store, a single store of a chain of stores, and multiple stores of a chain of stores.

According to an aspect of the disclosure, the location indicator indicating a predetermined location in the business establishment where the corresponding printed information sheet and/or the corresponding product are to be displayed may be selected from the group consisting of: at least one of an aisle identifier, an aisle-side identifier, a bay identifier, a section identifier, a shelf identifier, or a shelf location identifier, although any mechanism can be used as a location indicator to identify the predetermined location in the business establishment.

According to an aspect of the disclosure, the predetermined location in the business establishment may be selected from the group consisting of: at least one of an aisle, an aisle side, a bay, a section, a shelf, a location on the shelf and/or other structure in the business establishment, or any combination thereof. In some embodiments, the predetermined location in the business establishment may also include an identification of an adjacent product and/or other location information related to the product.

Figure 3A:
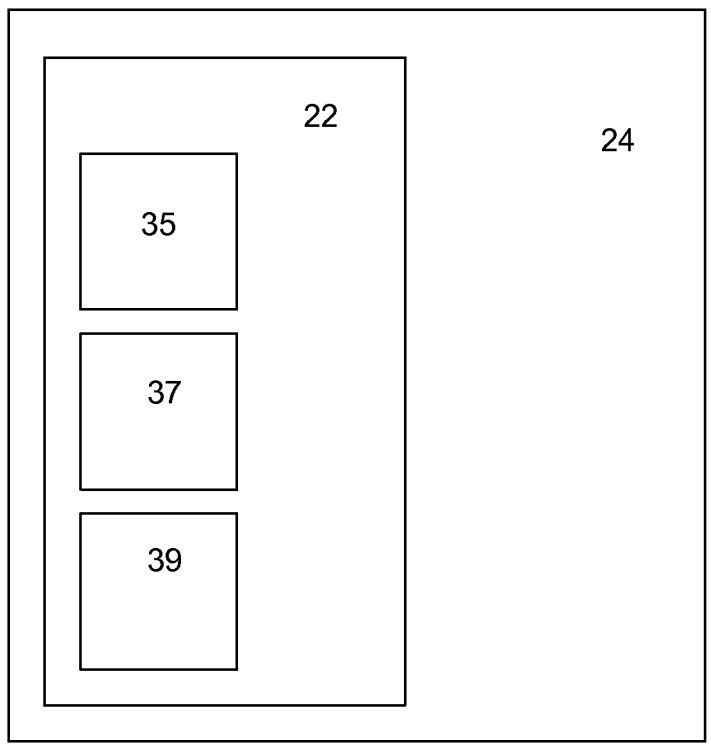
FIG. 3A illustrates an exemplary printed information sheet to be placed in the business establishment, according to an aspect of the disclosure.

According to an aspect of the disclosure, the product information 22 about a product to be displayed in the business establishment may be selected from the group consisting of: at least one of a machine readable code, a color, a name, a price, a machine readable code corresponding with the price, graphics, a logo, an advertisement, a coupon, or a promotion of the at least one associated product. For example, referring to FIG. 3A, the product information 22 related to the product that is printed on the printed information sheet 11 may comprise product description and/or graphical representation of the product, product price information 35, retailer-specific information 37, product attribute information 39, product category information (not shown), manufacturer-specific information (not shown), distributor-specific information (not shown), a combination thereof, and/or other information related to the product. Product price information 35 may comprise, for example, mandatory information to be displayed for a product, such as product identifier (graphical representation of the product or product description), product UPC code/symbol, Quick Response (QR) code, price, weight per unit, price per unit, number of units in a produce package and/or other information required by a governing authority (state) to be provided with a product displayed in a business establishment. Retailer-specific information 37 may comprise, for example, information relating to a sale, coupon, and/or other promotion of a product, cross-sell information about a related product, and/or other retailer-specific information about the product. Product attribute information 39 may comprise, for example, a product logo, information related to branding of the product, and/or other information related to the product. Product category information may comprise, for example, regulatory information to be provided with products in the product category associated with the product, product category indicator, and/or other information related to a product category of a product. Manufacturer-specific information may comprise, for example, regulatory information to be provided with the product, product manufacturer name, other indicia informing a viewer of the product origin or manufacture of the product, information related to other products from the manufacturer, and/or other information related to the manufacture and/or manufacturer of the product. Distributor specific information may comprise, for example, distributor name, other indicia informing a viewer of the distributor of the product, related products from the distributor, and/or other information related to the distributor of the product.

In some embodiments, the array 10 may include a plurality of stacks. The number of stacks in the array 10 may vary. For example, the array 10 may include any suitable number of stacks, such as, e.g., at least two, at least three, at least four, at least five, at least six, at least seven, at least eight, or any other suitable number.

In some embodiments, the relative order of the stacks in an array corresponds to relative locations of the products printed on the printed information sheets of the stack. In some embodiments, the location in the business establishment of a first multiple product information sheet of a stack in an array is adjacent to the location of the last printed information sheet of the adjacent previous stack in the same array. The location in the business establishment of a first multiple product information sheet of the adjacent next stack in the same array is adjacent to the location of the last printed information sheet of the stack. In some embodiments, the location in the business establishment of a first multiple product information sheet of the adjacent next stack in the same array may not be adjacent to the location of the last printed information sheet of the adjacent stack and may be a different location in the business establishment.

In some embodiments, each of the plurality of stacks in the array 10 may include printed information sheets having the same size. Each of the plurality of stacks have printed information sheets having the same template, same layout, same types of information printed thereon, any combination thereof, and/or other information positioned on the printed information sheets.

In some embodiments, the size of the printed information sheets in one stack may be different from that in another stack in the array. For example, the size of stack 12 may be different than the size of stack 14, for example, by having a larger width, so that individual stacks in any given array may have the same or different widths. In some embodiments, the template and layout, types of information printed, any combination thereof, and/or other information disposed on the printed information sheets in one stack may be different from that in another stack in the array.

In some embodiments, each stack in the array may have printed information sheets 11 having different templates, different layouts, different types of printed information, information printed in different orientations, different colors, and/or with other different formats, different connectors for connection to a respective structure in the business establishment, and/or may otherwise have different characteristics. For example, the respective printed information sheets in the first multiple product information sheet 18 and the second multiple product information sheet 20 in the same stack may have different templates, may be of different sizes, may comprise different types of printed information, may comprise information printed in different orientations, colors, and/or with other different formats, may comprise different connectors for connection to a respective structure in the business establishment, and/or may otherwise have different characteristics. In some embodiments, the first multiple product information sheet 18 and the second multiple product information sheet 20 in the same stack may have the same characteristics.

Each stack 12, 14, 16 of printed information sheets 11 may be detachably connected to an adjacent stack 12, 14, 16, or to the corresponding array 10 as a whole. The stack 12 of the array 10 may be detachably connected to an adjacent stack 14, where the stack 14 may be detachably connected to stack 12 on one side and stack 16 on the other side. In some embodiments, the stacks 12 and 16 may be referred to as end stacks and the stack 14 may be referred to as an intermediate stack. In some embodiments, end stacks 12 and 16 may have a free side 33 and a connection side 31, while the intermediate stack 14 may have two connection sides 31. In some embodiments, when the stacks 12, 14, 16 are detachably connected to the corresponding array 10 as a whole, the stacks may be detachably connected to the corresponding array at their top portions or on one of their sides.

The stacks 12, 14, 16 may be detachably connected to each other by one or more frangible connections 30. In some embodiments, frangible connections 30 may include breakable, tearable, weakened, or any other connections that enable detachable connection between the stacks. In some embodiments, the frangible connections 30 may be disposed on their connection edges 31. Frangible connection 30 may be comprised of a scored or perforated line, or a complete cut up to the bound edge (e.g., upper edge 26 or lower edge 25) of each independent multiple product information sheet 18, 20. A preferred frangible connection is a completely severed boundary between adjacent stacks up to a distance from the bound edge sufficient to maintain the respective stacks, information sheets, and multiple product information sheets in their relative positions with respect to one another. In an embodiment, the distance is from 0.01 to 10 cm from the bound edge, or from 0.05 to 5 cm, or from 0.1 to 3 cm, or from 0.3 to 1 cm, or any range therein.

A person having ordinary skill in the art is capable of determining the suitable distance to maintain the relative positions of the respective stacks and sheets, using the guidelines provided herein, and given the type of material used to bind the multiple product information sheets to one another, and the type of material used to form the respective printed information sheets.

In some embodiments, the stacks 12, 14, 16 are generally arranged in a substantially linear fashion and may be detachably connected via the frangible connections to each other in an end-to-end (or side-to-side) linked arrangement. For example, one or more frangible connections 30 may be disposed at one or more locations along the sides of the corresponding stacks being detachably connected. In some embodiments, when the stacks 12, 14, 16 are generally arranged in an end-to-end (or side-to-side) arrangement, the stacks 12 may be detachably connected to the corresponding array as a whole at their top portions. In some embodiments, a frangible connection 30 may be disposed near the top edges of the corresponding stacks.

In some embodiments, the stacks are generally arranged in a substantially linear fashion and may be detachably connected to each other in a top-to-bottom linked arrangement. For example, one or more frangible connections 30 may be disposed at one or more locations along the bottom edge of one of the stacks and at one or more corresponding locations along the top edge of the other of the stacks to detachably connect the two stacks. In some embodiments, when the stacks 12, 14, 16 are generally arranged in top-to-bottom arrangement, the stacks 12 may be detachably connected to the corresponding array as a whole on one of their sides.

Referring to FIG. 1A, two frangible connections 30 may be positioned on the sides of the stacks. The number and placement of frangible connections, however, may vary.

Each printed information sheet 11 of each of the stacks preferably share one or more edges with adjacent corresponding printed information sheets. For example, referring to FIG. 1A, first printed information sheet 11A shares an edge with first printed information sheet 11B, and first printed information sheet 11B shares an opposite edge with first printed information sheet 11C. The edges shared by two printed information sheets may include tearable, frangible, breakable, weakened, or otherwise detachable connections. For example, the edges shared by two printed information sheets may include perforations, may be set out in thick lines to indicate a cutting line, and/or may otherwise be easily separable. In some embodiments, the edges shared by two printed information sheets may be include the frangible connections 30.

Figure 1B:
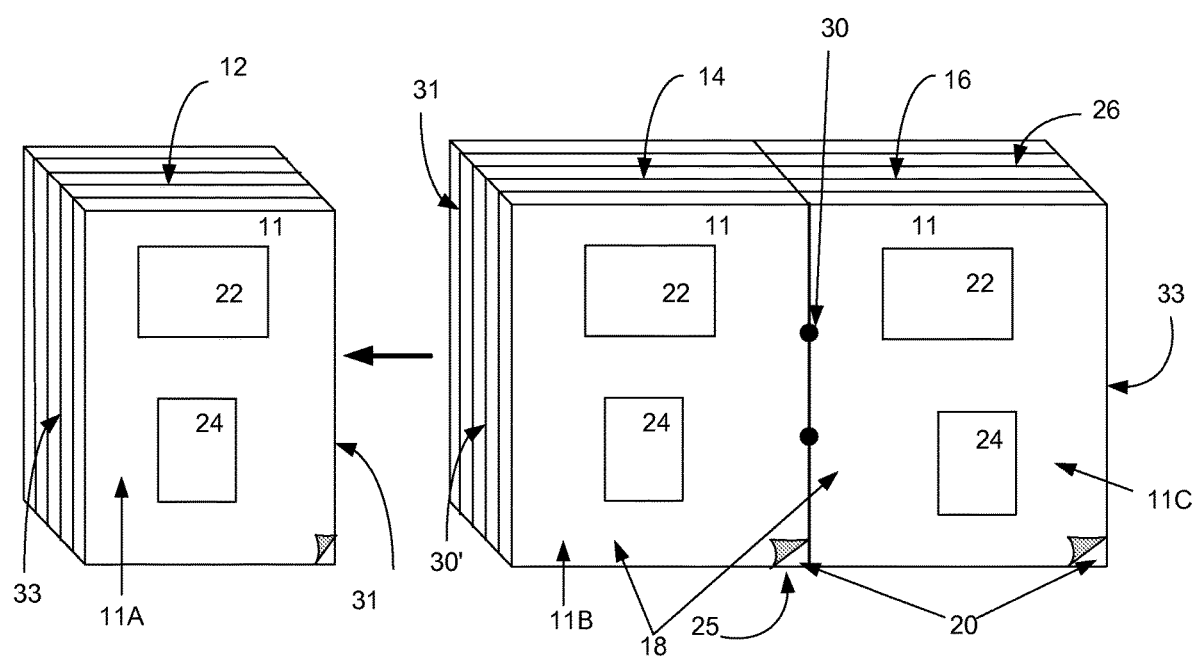

FIG. 1B illustrates exemplary array 10, where stack 12 has been removably detached from the array 10. An individual stack may be detached from the corresponding array by bending the stack away from the remainder of the array (such that the force of bending the stack is greater than the bonding force between the individual stack and the remainder of the array). In some embodiments, the stacks are separable from one another, such as, e.g., by breaking the frangible connection provided between the stacks, or any another suitable way. In some embodiments, the stack is separable from the array as a whole, such as, e.g., by breaking the frangible connection connecting that stack to the array, or any another suitable way. In some embodiments, the frangible connection may be configured to be bent back and forth until it breaks or snaps off. In some embodiments, the frangible connection may be configured to be bent in one direction until it breaks. In some embodiments, the frangible connection may include a weakened portion (perforation or slit) that is configured to assist in the snapping. In some embodiments, the stack may be detached from an adjacent stack of the array by breaking all the frangible connections provided between all printed information sheets of the two adjacent stacks. In an embodiment, stacks may be detached from the array with a snapping motion using only a small amount of force. As shown in FIG. 1A, snapping stack 12 in the direction of arrow A-A will cause stack 12 to separate, as shown in FIG. 1B. Typically, the force required to break stack 12 from the array is less than the force required to snap a No. 2 pencil in half. In the event the stacks prove difficult to detach, they can easily be detached by placing the frangible connection on the edge of a hard surface, for example a desk or table, and detaching the stack by pushing down on the stack hanging over the edge of the surface.

In some embodiments, the stacks may correspond to all of the products for display in the business establishment. In some embodiments, the stacks may correspond to a subset of the products for display in the business establishment. For example, each stack 12, 14, 16 may comprise replacement sheets for printed information sheets 11 that are positioned throughout the business establishment. Each stack 12, 14 or 16 also may correspond only to products to be placed in a certain section aisle, shelf, and/or other area of the business establishment.

In some embodiments, a first multiple product information sheet 18 of each stack 12, 14 or 16 may include business establishment information including name and/or description of the business establishment, a number or a code associated with the business establishment, or combination thereof; date when the printed information sheets 11 of the corresponding stack 12, 14, 16 are to be displayed in the business establishment; department information including name, description, or a number or a code associated with department in the business establishment where the corresponding stack is to be displayed; section information including name, description, or a number or a code associated with section in the business establishment where the corresponding stack is to be displayed; and information about the number of the printed information sheets 11 of the corresponding stack 12, 14, 16 or any other information.

Each of the individual printed information sheets 11 may be detached from the associated stack 12, 14, or 16 in the order in which the printed information sheets 11 may be connected to structures in the business establishment based on a planogram for a set of products for display in the business establishment.

Figure 2A:
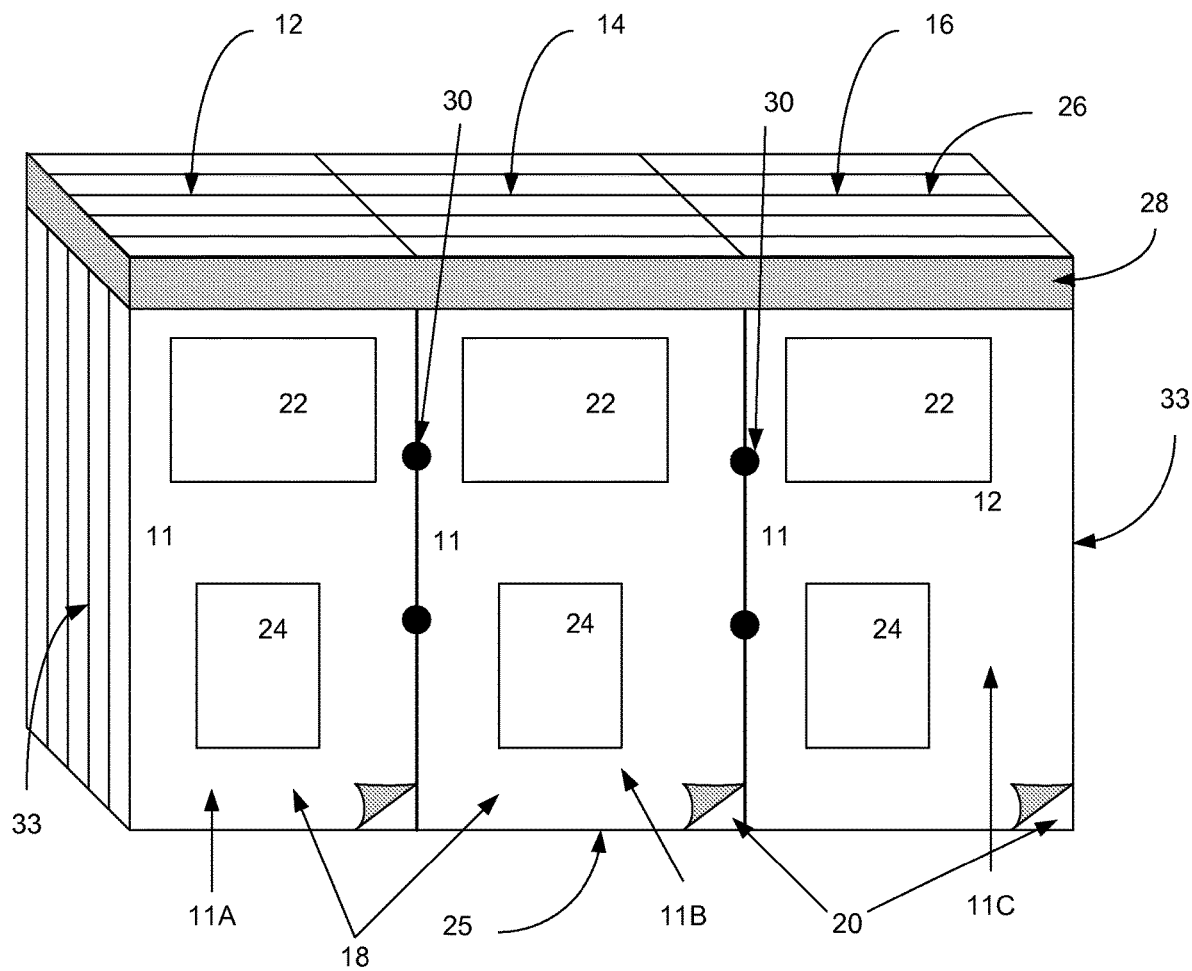
FIGS. 2A-2E illustrate exemplary arrays of printed information sheets to be placed in the business establishment, according to aspects of the disclosure.
Figure 2B:
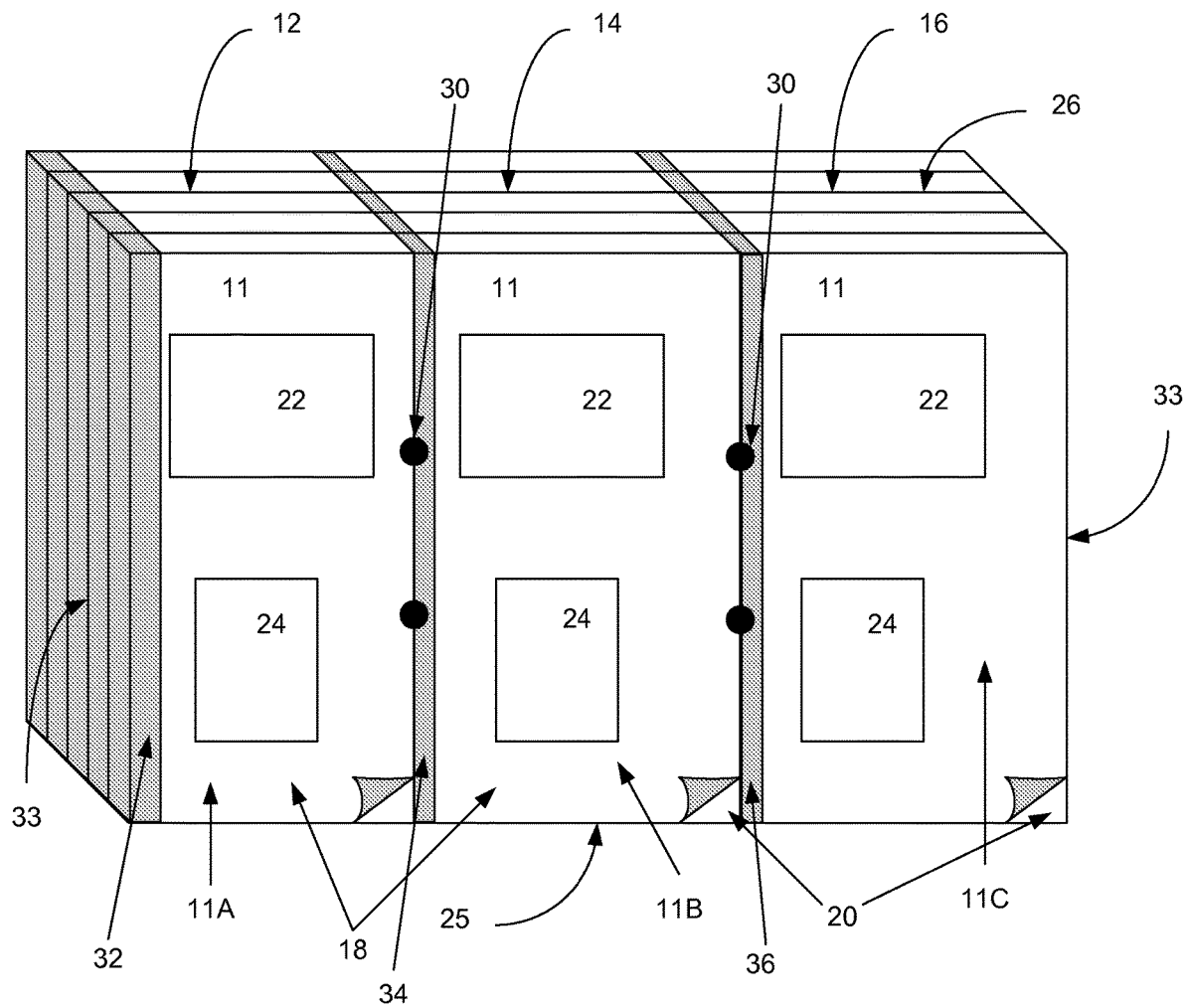
Figure 2C:
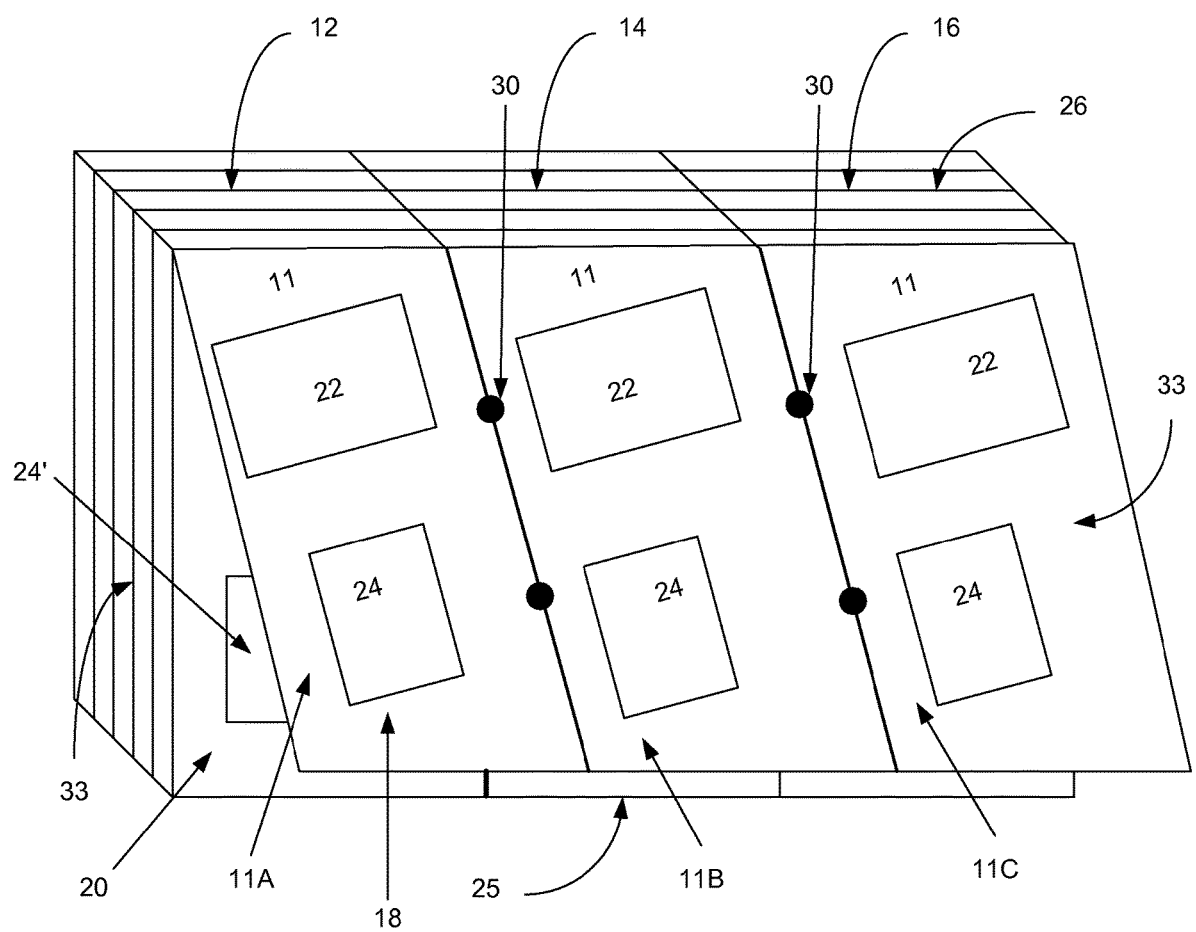

Each individual printed information sheet 11 may be bound to the corresponding stack 12, 14, or 16. For example, the first multiple product information sheet 18 may be bound to an adjacent second multiple product information sheet 20 as shown in FIGS. 2A and 2B (e.g., a given width of adhesive 28 as in FIG. 2A, or the entire sheets are bound to one another), or only an edge of each information sheet 11 (e.g., a given width of adhesive 32, 34, 36, or the entire sheets are bound to one another) may be bound to the adjacent printed information sheet 11 in the adjacent multiple product information sheet 18, 20. As shown in FIG. 2C, the associated stacks 12, 14 or 16 may be bound at a corresponding edge of each of the individual multiple product information sheets, for example, at upper edge 26 or lower edge 25.

As shown in FIG. 2A, an individual printed information sheet 11 may be bound to the remainder of the corresponding stack. For example, the first multiple product information sheet 18 of the stack 12, 14 or 16 may be removably attached to an adjacent second multiple product information sheet 20 of the same stack 12, 14 or 16, where the second multiple product information sheet 20 has been removably attached to an adjacent third bound sheet of the same stack 12, 14 or 16. The first multiple product information sheet 18 may be removably attached to the second multiple product information sheet 20 by an adhesive, by VELCRO, by glue, and/or by any known mechanisms for releasably securing sheets of material to one another. An individual printed information sheet 11 may be removed from the corresponding stack by pulling the printed information sheet away from the remainder of the stack (such that the force of pulling the printed information sheet is greater than the adhesive force between the individual printed information sheet 11 and the remainder of the stack). As shown in FIG. 2A, the binding of the individual printed information sheets 11 may be by use of a given width of releasable adhesive 28 at or near a top edge of the printed information sheets, or the releasable adhesive may extend along substantially the entire width and length of the printed information sheet 11.

FIG. 2B shows an array similar in structure to the array of FIG. 2A, but the binding of the individual printed information sheets 11 in the stack may be by use of a given width of releasable adhesive (32, 34, 36) at or near a side edge of each of the printed information sheets 11. In this embodiment, the printed information sheets may be elongated along the length of the releasable adhesive, and be in the form of labels or strips as disclosed in, for example, U.S. Pat. No. 7,287,001, the disclosure of which is incorporated by reference herein in its entirety. Thus, a series of stacks of labels or strips may be included in one array, each stack corresponding to a different aisle in a store. A user need only break away the stack corresponding to the respective aisle in the business establishment, and, because the printed information sheets in each stack are arranged in a specific order, the sheets can be individually separated from the stack from top to bottom and applied to the shelves in the aisle in an orderly manner. In this embodiment, a location indicator may or may not be printed on the printed information sheet because the order in which the printed information sheets are positioned in each stack provides the location in the business establishment.

As shown in FIG. 2C, the stack 12, 14, or 16 may be bound by a releasable adhesive binding at a corresponding upper edge 26 of each of the individual printed information sheets 11. An individual printed information sheet 11 may be removed from the corresponding stack 12, 14, or 16 by tearing the printed information sheet 11 away from the remainder of the corresponding stack 12, 14, or 16.

Figure 2D:
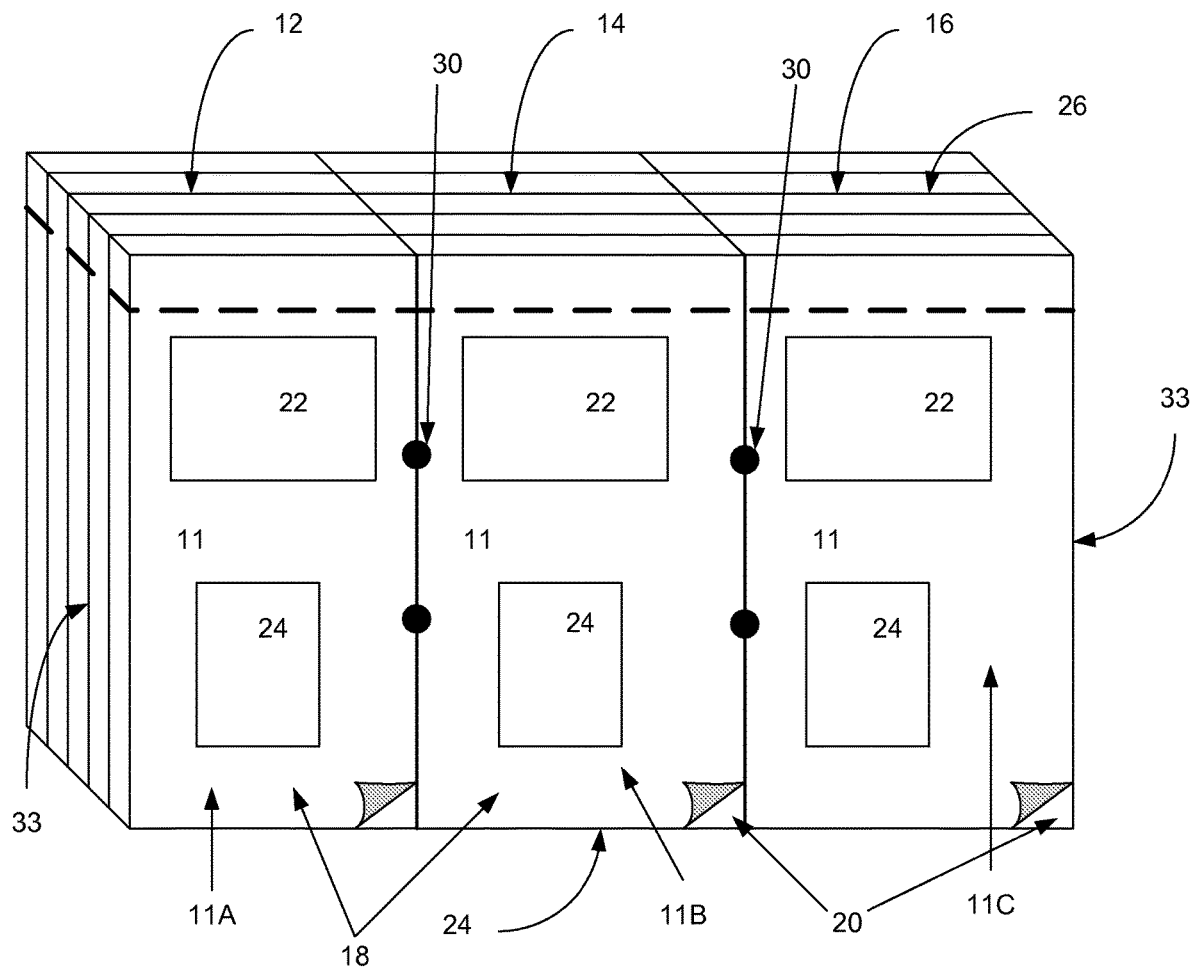

As shown in FIG. 2D, each individual printed information sheet 11 may comprise a header adjacent the top edge 26, with a tearable edge (dotted line in FIG. 2D) between the header of the printed information sheet and the remainder of the printed information sheet. The printed information sheets may be bound together in a stack using a strong adhesive, such as a glue, a heat-activated adhesive binding, and/or other adhesive. An individual printed information sheet may be removed from the stack via the tearable edge.

Figure 2E:
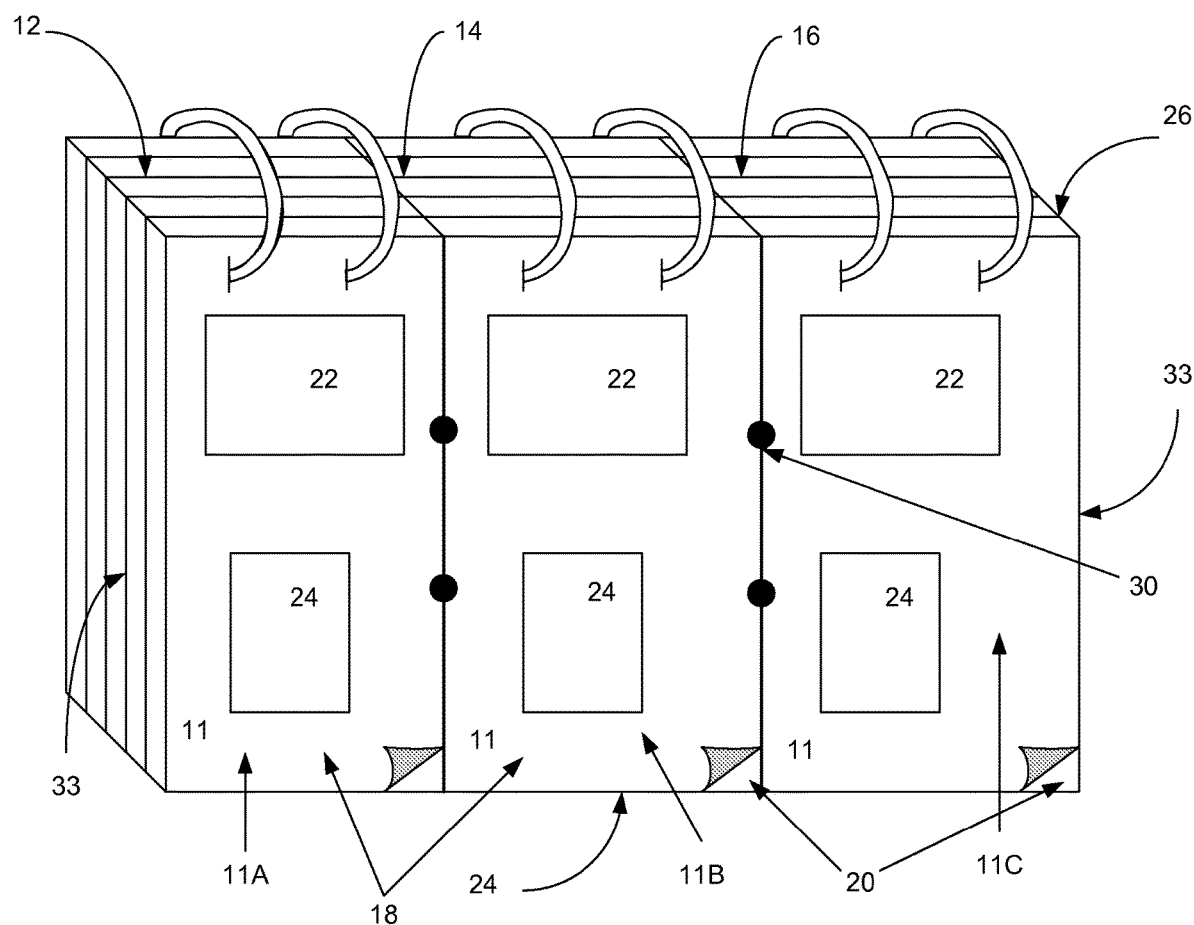

As shown in FIG. 2E, the stack of printed information sheets 11 may be bound by a spiral binding, staple binding, and/or other mechanical binding. An individual printed information sheet 11 may be removed from the stack by removing the entire individual printed information sheet out of the mechanical binding.

As described in detail in U.S. patent application Ser. No. 14/159,921, filed Jan. 21, 2014, and incorporated herein in its entirety by reference, in some embodiments, an individual sheet of the stack may comprise, for example, a single printed information sheet, a set of printed information sheets where printed information sheets share edge(s) with adjacent printed information sheets, a substrate on which a set of printed information sheets may be disposed, and/or other carrier onto which one or more printed information sheets may be disposed.

In some embodiments, one or more individual sheets 11 of a stack may comprise, for example, a substrate onto which one or more printed information sheets 11 are disposed. For example, the substrate may be an adhesive on which printed information sheets may be disposed. In another example, the substrate may be a liner and/or other backing for printed information sheets with an adhesive portion. In some examples, the printed information sheet may be disposed on a substrate with border(s) disposed around the printed information sheet or without any surrounding border(s) around the printed information sheet.

An individual printed information sheet 11 may be associated with an individual product displayed in the business establishment or a set of products that are displayed adjacent to each other in the business establishment.

In some embodiments, an individual printed information sheet may comprise information printed thereon that is the same as or similar to a strip, as described in U.S. Pat. No. 8,626,613, filed Jan. 10, 2003, and incorporated herein in its entirety by reference.

In some embodiments, the individual printed information sheet 11 may be placed at a shelf, peg board, and/or other structure near the location of the product associated with the individual printed information sheet. In some embodiments, the printed information sheet 11 may be placed on a shelf that includes a digital display, in a manner the same as or similar to the inclusion of shelf edge labels or strips in the display system as described in U.S. Pat. No. 7,287,001, filed Aug. 5, 2002, and incorporated herein in its entirety by reference.

The printed information sheet 11 may be placed adjacent to the product in the corresponding structure at which the product is displayed. In some embodiments, the planogram database, product database, and/or other databases may comprise information related to how the printed information sheet is to be attached to a structure at which the associated product(s) are displayed. In some embodiments, the structure itself may comprise a connector or the device into or onto which the individual printed information sheet 11 may be positioned. Based on the attachment, the individual printed information sheet 11 may be die cut to fit into a connector or holder disposed at the structure, may have a connector affixed thereon, and/or may otherwise be made ready to connect to the structure at which the printed information sheet is to be placed. In some embodiments, the individual printed information sheet 11 may comprise a connector via which the individual printed information sheet 11 may be attached to the structure. The connector of the individual printed information sheet 11 may comprise, for example, an adhesive connector, a clip, a button, and/or other fastener. In some embodiments, this operation may be performed before or after the stack of sheets comprising the set of printed information sheets are bound.

Location indicator information of an individual printed information sheet may comprise, for example, information related to an order of the printed information sheet relative to the other printed information sheets in the stack. In some embodiments, the stack of printed information sheets may be ordered based on the information printed on the printed information sheets of the stack. In some embodiments, the relative order of the printed information sheets in a stack correspond to relative locations of the products printed thereon. In some embodiments, the stack of printed information sheets may be ordered such that the printed information sheet, its adjacent previous printed information sheet and its adjacent next printed information sheet in the stack are each disposed at immediately adjacent locations in the business establishment. That is, the location in the business establishment of a printed information sheet of a stack is adjacent to the location of adjacent next printed information sheet in the same stack and is adjacent to the location of adjacent previous printed information sheet in the same stack.

In some embodiments, the location indicator may include a description of the predetermined location in the business establishment. In some embodiments, the location indicator may include numeric, alphabetic, alphanumeric, a scannable code, or other characters or a combination of these associated with a predetermined location in the business establishment where the printed information sheet and/or the product are to be displayed.

Figure 3B:
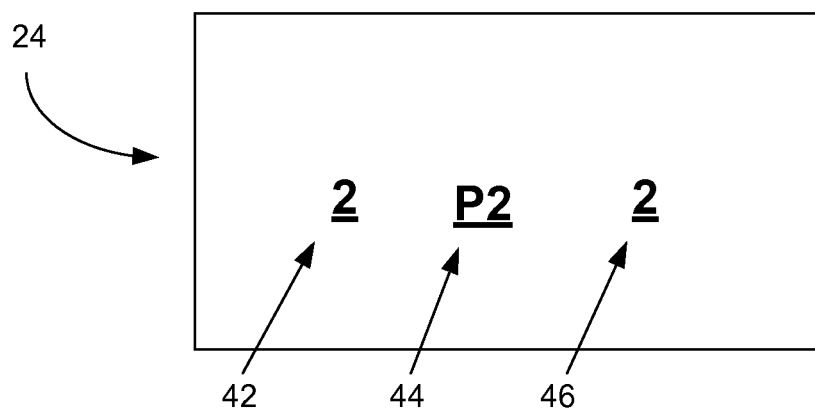
FIGS. 3B-3C illustrate exemplary location indicators of the printed information sheets, according to aspects of the disclosure.
Figure 3C:
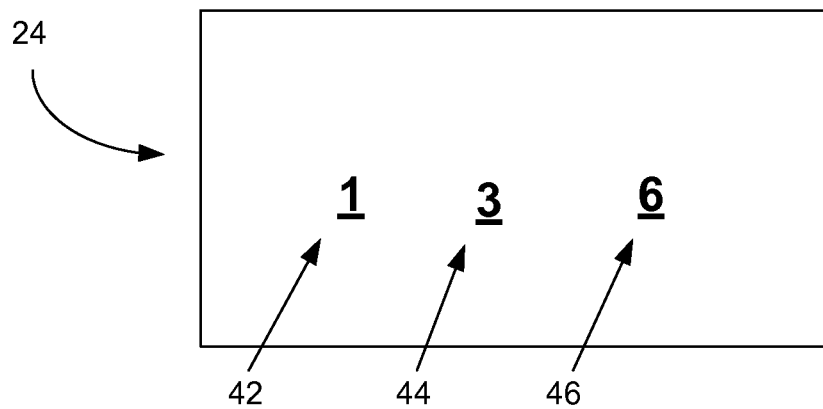

FIGS. 3B and 3C illustrate exemplary location indicators according to aspects of the disclosure. In some embodiments, referring to FIGS. 3B and 3C, the location indicator 24 may include a first indicator 42, a second indicator 44 and a third indicator 46. Each of the first indicator 42, the second indicator 44 and the third indicator 46 may include numeric, alphabetic, alphanumeric, a scannable code, or other characters or a combination thereof. In some embodiments, the first indicator 42 of the location indicator 24 indicates the shelf number, row number, planogram number, item position, number of facings or other factors, depending on business establishment preferences, in the business establishment where the corresponding printed information sheet and product are to be displayed. In some embodiments, the second indicator 44 of the location indicator 24 indicates the location of shelf number, row number, planogram number, item position, number of facings or other factors, depending on business establishment preferences, in the business establishment where the corresponding printed information sheet and product are to be displayed. In some embodiments, the third indicator 46 of the location indicator 24 indicates the location of shelf number, row number, planogram number, item position, number of facings or other factors, depending on business establishment preferences, in the business establishment where the corresponding printed information sheet and product are to be displayed. The first, second, and third indicator (42, 44, 46) may contain the same or different location indicator information, or preferably, each contains different location information.

In some embodiments, as shown in FIG. 3B, the second indicator 44 of the location indicator 24 may include a two character code. Although the two character code of the second indicator 44 in FIG. 3B is shown to have a combination of numeric and alphabetic characters, it is contemplated that the two character code of the second indicator 44 may include either two numbers or two letters of the alphabet or a code that is capable of being scanned. Alternatively, as shown in FIG. 3C, the second indicator 44 may include a one character code.

In some embodiments, as shown in FIGS. 3B and 3C, the third indicator 46 and first indicator 42 of the location indicator 24 may include a one character (numeric) code. It is contemplated, however, that the third indicator 46 and first indicator 42 of the location indicator 24 may include a two character code that includes numeric, alphabetic, alphanumeric, a code that is capable of being scanned, other characters or a combination of these. In some embodiments, the number of characters in each of the first indicator 42, the second indicator 44 and the third indicator 46 may vary.

In some embodiments, the printed information sheets 11 are arranged in the corresponding stack such that the third indicators 46 of a first set of consecutive printed information sheets 11 are in a descending order (i.e., for example, from 10 to 1 or from 5 to 1), while the second and first indicators 44 and 42 of the first set of consecutive printed information sheets 11 remain the same. In some embodiments, the printed information sheets 11 are arranged in the corresponding stack such that, in a second set of consecutive printed information sheets 11, the second indicator 44 has changed from that of the first set of consecutive printed information sheets 11, while the first indicator 42 remains the same as that of the first set of consecutive printed information sheets 11. Like the first set of consecutive printed information sheets 11, the third indicators 46 of the second set of consecutive printed information sheets 11 may be in a descending order (i.e., for example, from 10 to 1 or from 5 to 1). In some embodiments, the printed information sheets 11 can be arranged in the corresponding stack such that the second indicators 44 of consecutive sets of consecutive printed information sheets 11 are in a descending order (i.e., 5 to 1).

In some embodiments, the information related to the order of the printed information sheets in a stack may include a number relating to the position of the printed information sheet in the set of printed information sheets included in the stack, planogram information for the product(s) associated with the printed information sheet from a planogram of products available in the business establishment, a combination thereof, and/or other information related to the order of the printed information sheet relative to the other printed information sheets in the stack.

The planogram information may comprise information related to the location of the associated product(s) in the business establishment, a location at which the printed information sheet is to be placed in the business establishment, a combination thereof, and/or other information related to the location of the printed information sheet. In some embodiments, the stack may be ordered based on the planogram information of the printed information sheets (e.g., based on locations at which the printed information sheets of the stack are to be placed).

In some embodiments, the product(s) associated with an individual printed information sheet, a size of a printed information sheet, a template of the printed information sheet, a layout of the information printed on the printed information sheet, the types of information printed on the printed information sheet, a potential connector attached to the printed information sheet, and/or other information related to the printed information sheet may be obtained based on the planogram for the business establishment.

For example, a first multiple product information sheet in a stack may have a width of 15 cm, 30 cm, 45 cm, 60 cm, 75 cm, 90 cm, 1 m, 1.2 m, 1.5 m, or up to 2 meters, may be die cut to fit into a connector at a first shelf, and may be placed as a shelf talker (i.e., printed material, or other mechanism positioned on or near a business establishment's shelf to call a buyer's attention to a particular product on the shelf) at the first shelf, while a second multiple product information sheet adjacent to the first multiple product information sheet in the stack may comprise a portion with adhesive backing to attach to a connector at a second shelf adjacent to the first shelf in the business establishment. In this example, the first multiple product information sheet may be a shelf talker while the second multiple product information sheet may comprise information related to a promotion of a product on an adjacent shelf. The same differences may exist with respect to each printed information sheet 11. For example, an information sheet 11A may be of a certain width and may be a shelf talker, while an adjacent information sheet 11B may be of a different width and may comprise information related to a promotion of a product on an adjacent shelf.

In some embodiments, the location indicator and/or the planogram information may be printed on the printed information sheet. The position(s) of the product information, the location indicator, the planogram information, and/or any combination thereof on a printed information sheet is not limited to the examples described herein.

In some embodiments, the planogram information may be printed separately from the location indicator information on a printed information sheet. In some embodiments, the planogram information may comprise information related to the location of the associated product(s) in the business establishment, a location at which the printed information sheet is to be placed in the business establishment, a combination thereof, and/or other information related to the location in the business establishment at which the printed information sheet is to be placed. In some embodiments, the stack may be ordered based on the planogram information of the printed information sheets (e.g., based on a location at which the printed information sheets of the stack are to be placed).

In some embodiments, the planogram information may comprise textual information related to a specific placement of the product (e.g., with regard to aisle, shelf, location on shelf, and/or other location of an associated product), a graphic depiction of a location in the business establishment (e.g., absolute location, location relative to a next ordered printed information sheet, and/or other location) based on the planogram information for the printed information sheet, a combination thereof, and/or other information related to the location of the printed information sheet in the business establishment. In some embodiments, the planogram information may also comprise information related to placement location of an adjacent previous printed information sheet and an adjacent next printed information sheet in the stack.

In some embodiments, the planogram information also may comprise a graphical representation of a structure and product(s) associated with the printed information sheet, a graphical representation of a structure at which the printed information sheet is to be positioned and adjacent product(s), a graphical representation of a structure at which the printed information sheet is to be positioned and the placement of other printed information sheets onto that structure, a graphical representation of a structure at which the printed information sheet is to be positioned, the placement of other printed information sheets onto that structure, one or more connectors and/or other attachment mechanisms on the structure at which no printed information sheets are to be placed, and/or other graphical representations of the position of the printed information sheet in the business establishment.

In some embodiments, a set of printed information sheets may correspond to a subset of the products included in the planogram. For example, a set of printed information sheets may comprise replacement sheets for printed information sheets that are positioned throughout the business establishment. In another example, printed information sheets may not be placed at every available position in the business establishment. In other embodiments, the stack may comprise a set of printed information sheets for all of the products included in the planogram. In these embodiments, the set of printed information sheets may comprise a first subset of printed information sheets that correspond to the subset of products and a second subset of information sheets that do not correspond to any products in the planogram. The second subset of information sheets may be blank, may have printed thereon an indication that the individual printed information sheet is not associated with a product in the planogram (e.g., an indication of "Empty", "No Label", "No Tag", and/or other indication), may have printed thereon only location indicator 24, planogram information, and/or may have printed thereon any combination thereof. The first subset of printed information sheets and the second subset of information sheets may be ordered in the stack based on the planogram for the business establishment. For example, where a first product in the planogram is associated with a printed information sheet, a second product is not associated with any printed information sheets, and a third product is associated with a second printed information sheet, the stack may comprise a set of sheets including the first printed information sheet, a blank product information sheet, and the second printed information sheet made available in order.

Figure 4:
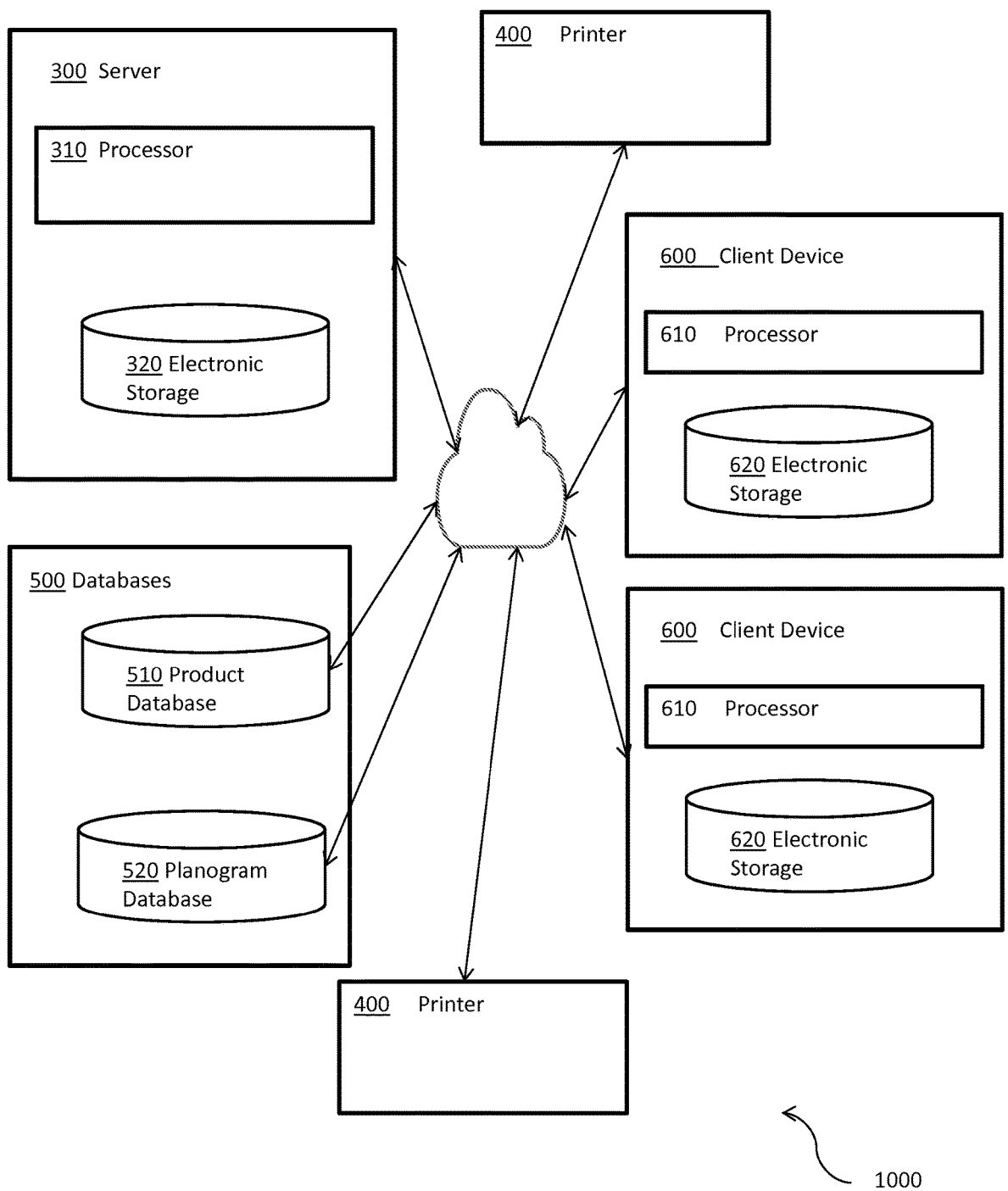
FIG. 4 illustrates a system for producing an array of printed information sheets, according to an aspect of the disclosure.

FIG. 4 illustrates a system 1000 for producing the array of printed information sheets, according to an aspect of the disclosure. The system 1000 may include a server 300 configured to receive planogram information related to a set of products at a business establishment, and send information to be printed on the array of printed information sheets to one or more printers 400. The server 300 may be communicably coupled to one or more databases, such as, for example, a product database 510 configured to store product information for a plurality of products, a planogram database 520 configured to store planogram information for one or more business establishments, and/or other databases. In some embodiments, system 1000 also may comprise one or more client devices 600 which may be associated with a business establishment. A client device 600 may comprise, for example, one or more physical processors 610, a non-transitory electronic storage device 620, and/or other components. The server 300 may be configured to obtain planogram data and product data from non-transitory electronic storage device 320, from one or more of the product database 510, the planogram database 520, and/or other databases, from one or more client devices 600, and/or from other sources.

Based on the planogram data and the structure at which a product is displayed, information sheets may be printed by the one or more physical processors and the one or more printers, such that the printed information sheets may comprise information about the set of products for display in the business establishment. An individual printed information sheet may have printed thereon information about an individual product or a set of adjacent products, a location indicator indicating a predetermined location in the business establishment where the printed information sheet is to be displayed, an order indicator indicating an order of the printed information sheet relative to the other printed information sheets in the set of printed information sheets, and/or other information related to the product or set of products associated with the individual printed information sheet.

The server 300 may be any computing device such as, for example, a server, a desktop computer, laptop computer, personal digital assistant, smart phone, and/or any other computing device. Other configurations and system architectures may be used. For example, although not shown, server 300 may be or include one or more servers connected to one or more clients via a network such as a Wide Area Network, Local Area Network, the Internet, a cloud-based network and/or other network or combination thereof. The server 300 may be capable of communicating with network, non-transitory electronic storage device 320, databases 500, and/or other computing devices. The server 300 may include a plurality of hardware, software, and/or firmware components operating together to provide the functionality attributed herein to server 300. For example, server 300 may be implemented by a cloud of computing platforms operating together as server 300.

Processor(s) 310 may be configured to provide information processing capabilities in computing device 300. As such, processor 310 may include one or more of a digital processor, an analog processor, a digital circuit designed to process information, an analog circuit designed to process information, a state machine, and/or other mechanisms for electronically processing information. Although processor 310 is shown in FIG. 4 as a single entity, this is for illustrative purposes only. In some embodiments, processor 310 may include a plurality of processing units. These processing units may be physically located within the same device, or processor 310 may represent processing functionality of a plurality of devices operating in coordination. The processor 310 may be configured to execute functionality by software; hardware; firmware; some combination of software, hardware, and/or firmware; and/or other mechanisms for configuring processing capabilities on processor 310.

The non-transitory electronic storage device 320 may be at least one database that stores system data such as information related to the plurality of products, planogram information, information related to the stack, information related to activity performed via the system 1000, and/or any other data. The non-transitory electronic storage device 320 may be associated and communicate with the server 300.

The one or more databases comprising the non-transitory electronic storage device 320 may be, may include, or may interface with, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some embodiments, the non-transitory electronic storage device 320 may be part of or hosted by a computing device on the network. In some embodiments, the non-transitory electronic storage device 320 may be part of or hosted by the server 300. In some embodiments, the non-transitory electronic storage device 320 may be physically separate from the server 300 but may be operably communicable therewith.

In some embodiments, the non-transitory electronic storage device 320 may comprise electronic storage media that electronically stores information. The non-transitory electronic storage device 320 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The non-transitory electronic storage device 320 may include one or more virtual storage resources (e.g., cloud storage, a virtual private network, and/or other virtual storage resources). The non-transitory electronic storage device 320 may store software algorithms, information determined by processor 310, information received from server 300, information received from client devices 600, information received from third parties, and/or other information that enables server 300 to function as described herein.

A client device 600 may facilitate communication with the server 300. For example, a user may communicate with the server 300 via a client device 600. In some embodiments, the term user may be interchangeably used herein with the term client device. In some embodiments, a user's actions and/or functionality as described herein may be carried out and/or implemented by a client device 600. A client device 600 may include one or more processors 610 that are configured to execute computer program components. The computer program components may be configured to enable an expert or user associated with the client device 600 to interface with system 1000 and/or other components of the system 1000, and/or to provide other functionality attributed herein to client device 600. By way of non-limiting example, the client device 600 may include one or more of a desktop computer, a laptop computer, a handheld computer, a tablet computing platform, a NetBook, a Smartphone, a gaming console, and/or other computing platforms. The client device 600 may be capable of communicating with network, server 300, non-transitory electronic storage device 320, databases 500, and/or other computing devices.

Processor(s) 610 may be configured to provide information processing capabilities in client device 600. As such, processor 610 may include one or more of a digital processor, an analog processor, a digital circuit designed to process information, an analog circuit designed to process information, a state machine, and/or other mechanisms for electronically processing information. Although processor 610 is shown in FIG. 4 as a single entity, this is for illustrative purposes only. In some embodiments, processor 610 may include a plurality of processing units. These processing units may be physically located within the same device, or processor 610 may represent processing functionality of a plurality of devices operating in coordination. The processor 610 may be configured to execute functionality by software; hardware; firmware; some combination of software, hardware, and/or firmware; and/or other mechanisms for configuring processing capabilities on processor 610.

The non-transitory electronic storage device 620 may be at least one database that stores system data such as information related to the plurality of products, planogram information, information related to the ordered stack of bound sheets, information related to activity performed via the system 1000, and/or any other data. The non-transitory electronic storage device 620 may be associated and communicate with the client device 600.

The one or more databases comprising the non-transitory electronic storage device 620 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some embodiments, the non-transitory electronic storage device 620 may be part of or hosted by a computing device on the network. In some embodiments, the non-transitory electronic storage device 620 may be part of or hosted by the client device 600. In some embodiments, the non-transitory electronic storage device 620 may be physically separate from the client device 600 but may be operably communicable therewith.

In some embodiments, the non-transitory electronic storage device 620 may comprise electronic storage media that electronically stores information. The non-transitory electronic storage device 620 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The non-transitory electronic storage device 620 may include one or more virtual storage resources (e.g., cloud storage, a virtual private network, and/or other virtual storage resources). The non-transitory electronic storage device 620 may store software algorithms, information determined by processor 610, information received from server 300, information received from other client devices 600, information received from third parties, and/or other information that enables client device 600 to function as described herein.

The printers 400 may be any known printers that are able to receive data from the server 300, over a wired or wireless network or by wired connection to the server 400. The printers 400 may be any known printers capable of, configured to, or configurable to print the printed information sheets in the manner described herein.

The databases 500 may be at least one database that stores system data such as information related to the plurality of products, planogram information, information related to predetermined locations in the business establishment where the printed information sheets are to be displayed, information related to the ordered stack of bound sheets, information related to activity performed via the system 1000, information regarding regulations of various jurisdictions that govern the type(s) of information required for a given product or product type, and/or any other data. The non-transitory electronic storage device 320 may be associated and communicate with the server 300.

The one or more databases 500 may be, may include, or may interface with, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The databases 500 may comprise one or more such databases that reside in one or more physical devices and in one or more physical locations. The database may store a plurality of types of data and/or files and associated data or file descriptions, administrative information, or any other data.

In some embodiments, the databases 500 may be part of or hosted by a computing device on the network. In some embodiments, the databases 500 may be part of or hosted by the server 300. In some embodiments, the databases 500 may be physically separate from the server 300 but may be operably communicable therewith.

In some embodiments, the databases 500 may comprise electronic storage media that electronically stores information. The databases 500 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The non-transitory electronic storage device 320 may include one or more virtual storage resources (e.g., cloud storage, a virtual private network, and/or other virtual storage resources). The non-transitory electronic storage device 320 may store software algorithms, information determined by processor 310, information received from server 300, information received from client devices 600, information received from third parties, and/or other information that enables server 300 to function as described herein.

FIG. 5 illustrates a flow chart of an exemplary method 50 for producing an array of printed information sheets, according to an aspect of the disclosure. In some embodiments, the computer-implemented method 50 for producing array of printed information sheets may be implemented in the computer system 1000 that may include the server 300 with one or more physical processors 310 and one or more printers 400 communicably coupled to the one or more physical processors 310.

The operations of the method 50 presented below are intended to be illustrative. In some embodiments, the method 50 may be accomplished with one or more additional operations not described, and/or without one or more of the operations discussed. Additionally, the order in which the operations of the method 50 are illustrated in FIG. 5 and described below is not intended to be limiting.

In some embodiments, the method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 50 in response to instructions stored electronically on an electronic storage medium. The one or more processing devices may include one or more devices configured through hardware, firmware, and/or software to be specifically designed for execution of one or more of the operations of the method 50.

As shown in operation 52, the method for producing an array of printed information sheets may comprise, for example, obtaining, by the one or more physical processors 310, planogram data for a business establishment, wherein the planogram data identifies a set of products for display in the business establishment, and, for each individual product of the set of products, information related to a respective location in the business establishment at which the individual product is displayed. Information related to a location at which a product is displayed may comprise, for example, an aisle number, a section number, a shelf number and/or other structure number, a location on the shelf and/or other structure, an identification of an adjacent product, any combination thereof, and/or other location information related to the product.

As shown in an operation 54, product and planogram data related to the products may be apportioned among the set of printed information sheets based on the planogram data. The products may be apportioned among the set of printed information sheets in order of their location in the business establishment, based on the planogram data for the business establishment.

In an operation 56, the set of printed information sheets may be printed. For example, based on the planogram data and the structure at which a product is displayed, a set of printed information sheets may be printed by the one or more physical processors 310 and the one or more printers 400, such that the set of printed information sheets have printed thereon information about the set of products for display in the business establishment. An individual printed information sheet may have printed thereon information about an individual product or a set of adjacent products, information about a location at which the printed information sheet is to be placed in the business establishment, and/or other information related to the product or set of products associated with the individual printed information sheet.

In some embodiments, a set of adjacent printed information sheets 11A, 11B and 11C may be printed such that the adjacent printed information sheets 11A, 11B and 18C are detachably connected to each other at their edges via breakable or tearable connections. In some embodiments, the number of adjacent printed information sheets in a set may vary. In some embodiments, a plurality of sets of adjacent printed information sheets may be printed such that the adjacent printed information sheets of each set are detachably connected to each other at their edges via breakable or tearable.

For example, in some embodiments, one or more printers are configured to print first product information about a first product to be displayed in the business establishment and a first location indicator indicating a first predetermined location in the business establishment where the first product is to be displayed on a first information sheet, thereby producing a first printed information sheet, and to print third product information about a third product to be displayed in the business establishment and a third location indicator indicating a third predetermined location in the business establishment where the third product is to be displayed on a third information sheet, thereby producing a third printed information sheet, where the first multiple product information sheet is detachably connected to the third printed information sheet. The one or more printers are also configured to print second product information about a second product to be displayed in the business establishment and a second location indicator indicating a second predetermined location in the business establishment where the second product is to be displayed on a second information sheet, thereby producing a second printed information sheet, and print fourth product information about a fourth product to be displayed in the business establishment and a fourth location indicator indicating a fourth predetermined location in the business establishment where the fourth product is to be displayed on a fourth information sheet, thereby producing a fourth printed information sheet, where the second multiple product information sheet is detachably connected to the fourth printed information sheet. In some embodiments, the second predetermined location is immediately adjacent to the first predetermined location in the business establishment, and the fourth predetermined location is immediately adjacent to the third predetermined location in the business establishment.

In some embodiments, the information to be printed on an individual printed information sheet 11 may be accessed or acquired, by the one or more physical processors 310, from one or more databases 500 communicably coupled to the one or more physical processors 310. The databases 500 may include, for example, a planogram database 510 comprising planogram data for the business establishment, a product database 520 comprising product information for the set of products for display in the business establishment, a non-transitory electronic storage device (e.g., non-transitory electronic storage device 320, non-transitory electronic storage device 620, and/or other non-transitory electronic storage device) configured to store a set of indicators for each individual product that indicate what information is to be printed for an individual product, and/or other information related to the set of products, and/or other databases related to the business establishment. The databases also may include a regulatory database (not shown) that includes requirements for various jurisdictions regarding the type(s) of information to be disclosed with each product. An example of such a database or databases is disclosed in, for example, U.S. Patent Application Publication No. 2011/0066458, the disclosure of which is incorporated by reference herein in its entirety.

In an operation 58, the set of printed information sheets may be bound in an order based on the location indicator printed on the individual printed information sheets. For example, the set of printed information sheets may be bound at a same edge (e.g., an upper edge) with a glue binding, with a mechanical binding, with a removable adhesive binding, with a non-removable binding and a tearable strip, and/or by other types of binding. In some embodiments, the set of printed information sheets may be bound in an order in which the individual printed information sheets were printed such that the printed information sheets in each stack of the array are ordered based on the location indicator printed on the corresponding individual printed information sheets.

In some embodiments, the first printed information sheet related to the first product and detachably connected to the third printed information sheet related to the third product is bound to the second printed information sheet related to the second product and detachably connected to the fourth printed information sheet related to the fourth product to produce the array of the printed information sheets. In some embodiments, the second predetermined location at which the second printed information sheet is to be displayed is immediately adjacent to the first predetermined location in the business establishment at which the first printed information sheet is to be displayed, and the fourth predetermined location at which the fourth printed information sheet is to be displayed is immediately adjacent to the third predetermined location in the business establishment at which the third printed information sheet is to be displayed. In some embodiments, the first printed information sheet and the second printed information sheet form one stack of the array and the third printed information sheet and the fourth printed information sheet form another stack of the array. In some embodiments, the number of printed information sheets in a stack may vary.

In some embodiments, the first, the second, the third and the fourth printed information sheets are printed separately, where the second predetermined location at which the second printed information sheet is to be displayed is immediately adjacent to the first predetermined location in the business establishment at which the first printed information sheet is to be displayed, and the fourth predetermined location at which the fourth printed information sheet is to be displayed is immediately adjacent to the third predetermined location in the business establishment at which the third printed information sheet is to be displayed. The first and the second printed information sheets are bound to form a first stack, and the third and the fourth printed information sheets are bound to form a second stack. In some embodiments, the printed information sheets in a stack may be bound to each other or to the corresponding stack. In some embodiments, the printed information sheets in a stack may be removable from or detachably connected to the corresponding stack. In some embodiments, the number of printed information sheets in a stack may vary. In some embodiments, the first and the second stacks are detachably connected to each other to form the array. In some embodiments, the number of stacks in the array may vary.

In some embodiments, either between operations 56 and 58, or after operation 58, any necessary connectors may be attached to individual printed information sheets. For example, an adhesive may be applied (with a lining and/or other backing) to a first printed information sheet in a stack while a clip may be applied to a second printed information sheet in the same stack. In some examples, a same type of connector may be applied to all of the printed information sheets in the stack.

In some embodiments, either before or after operation 56, the individual printed information sheets may be cut to a predetermined length. In some embodiments, a first printed information sheet of one stack may be cut to a first predetermined length and a first printed information sheet of another stack may be cut to a second predetermined length different from the first length. The predetermined length for an individual printed information sheet may be determined based on information stored at the system 1000 and/or may otherwise be determined.

In some embodiments, the printed information sheets may be printed in a manner the same as or similar to the printing of shelf edge labels or strips as described in U.S. Pat. No. 7,287,001, filed Aug. 5, 2002, and incorporated above in its entirety by reference, or in a manner the same as or similar to the printing of strips, as described in U.S. Pat. No. 8,626,613, filed Jan. 10, 2003, and incorporated above in its entirety by reference.

The printed information sheet may be placed adjacent to the product in the corresponding structure at which the product is displayed. In some embodiments, the planogram database 510, product database 520, regulations database, and/or other databases may comprise information related to how the printed information sheet is to be attached to a structure at which the associated product(s) are displayed. Based on the attachment information, the printed information sheet may be die cut to fit into a connector disposed at the structure, may have a connector affixed thereon, and/or may otherwise be made ready to connect to the structure at which the printed information sheet is to be placed. In some embodiments, this operation may be performed before or after the stack and/or array comprising the set of printed information sheets are bound.

Figure 6:
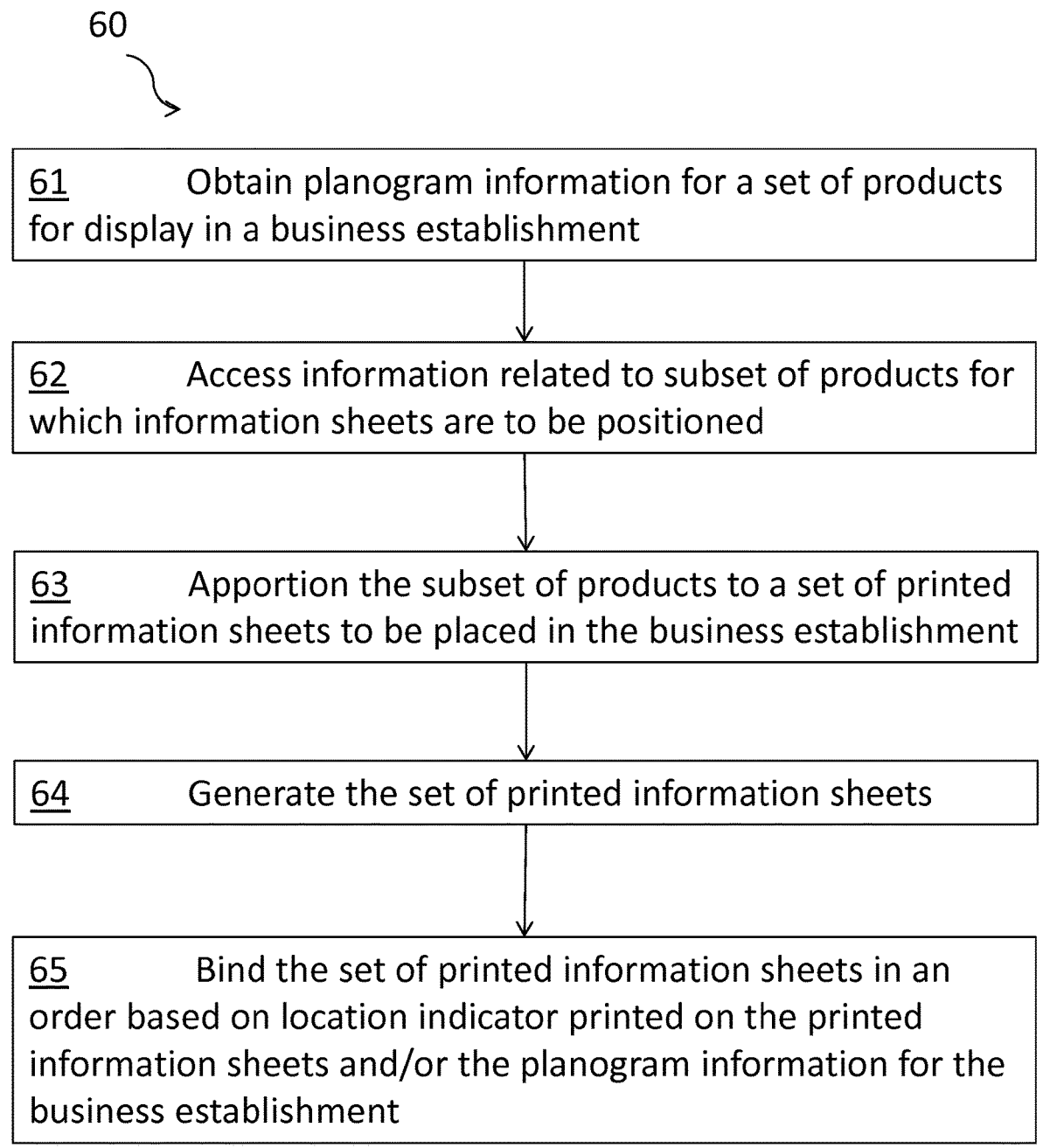

FIG. 6 illustrates a flow chart of an exemplary method 60 for producing an array of printed information sheets, according to an aspect of the disclosure. In some embodiments, the computer-implemented method 60 for producing an array of printed information sheets may be implemented in the computer system 1000 comprising the server 300 with one or more physical processors 310 and one or more printers 400 communicably coupled to the one or more physical processors 310.

As shown in operation 61, the method 60 for producing an array of printed information sheets for a subset of the products in the planogram for the business establishment may comprise, for example, obtaining, by the one or more physical processors 310, planogram data for a business establishment, wherein the planogram data identifies a set of products for display in the business establishment, and, for each individual product of the set of products, information related to a respective location in the business establishment at which the individual product is displayed. Information related to a location at which a product is displayed may comprise, for example, an aisle number, a shelf and/or other structure number, a location on the shelf and/or other structure, an identification of an adjacent product, any combination thereof, and/or other location information related to the product.

As shown in an operation 62, information may be obtained related to a subset of the products from the planogram for which product information sheets are to be positioned in the business establishment. The information related to the subset of products may be obtained from one or more databases (e.g., the planogram database 510, the product database 520, and/or other database), the non-transitory electronic storage device 310 of the server, the one or more client devices 600, and/or from other sources.

As shown in an operation 63, product and planogram data related to the products may be apportioned among the set of printed information sheets based on the planogram data. The products may be apportioned among the set of printed information sheets in order of their location in the business establishment, based on the planogram data for the business establishment.

In an operation 63, the set of printed information sheets may be generated. For example, based on the planogram data and the structure at which a product is displayed, a set of printed information sheets may be printed by the one or more physical processors 310 and the one or more printers 400, such that the set of printed information sheets have printed thereon information about the subset of products. An individual printed information sheet may have printed thereon information about an individual product or a set of products, information about a location at which the printed information sheet is to be placed in the business establishment, and/or other information related to the product or set of products associated with the individual printed information sheet.

In some embodiments, the information to be printed on an individual printed information sheet may be acquired, by the one or more physical processors 310, from one or more databases 500 communicably coupled to the one or more physical processors 310. The databases 500 may include, for example, a planogram database 510 comprising planogram data for the business establishment, a product database 520 comprising product information for the set of products for display in the business establishment, a non-transitory electronic storage device (e.g., non-transitory electronic storage device 320, non-transitory electronic storage device 620, and/or other non-transitory electronic storage device) configured to store a set of indicators for each individual product that indicate what information is to be printed for an individual product, and/or other information related to the set of products, and/or other databases related to the business establishment. The databases also may include a regulatory database (not shown) that includes requirements for various jurisdictions regarding the type(s) of information to be disclosed with each product. Such a database or databases is disclosed in, for example, U.S. Patent Application Publication No. 2011/0066458, the disclosure of which is incorporated by reference herein in its entirety.

In some embodiments in which the individual printed information sheets comprise planogram information indicating a location, structure, structure portion, and/or other position in the business establishment at which the individual printed information sheet is to be placed, printed information sheets are only generated for the subset of products.

In some embodiments, the printed information sheets may be generated for the remaining products in the planogram (e.g., the products included in the planogram but not included in the subset of products). In some embodiments, the generated printed information sheets for the remaining products may have printed thereon location indicator information 24, planogram information, an indication that the printed information sheet is not associated with any products, and/or any combination thereof. In some embodiments, the generated printed information sheets may not be manipulated in any manner (e.g., may be blank sheets that may not have any information printed thereon).

In some embodiments, a set of adjacent printed information sheets 11A, 11B and 11C may be printed such that the adjacent printed information sheets 11A, 11B and 11C are detachably connected to each other at their edges via breakable or tearable connections. In some embodiments, the number of adjacent printed information sheets in a set may vary. In some embodiments, a plurality of sets of adjacent printed information sheets may be printed such that the adjacent printed information sheets of each set are detachably connected to each other at their edges via a breakable or tearable frangible connection. For example, in some embodiments, one or more printers may be configured to print first product information about a first product to be displayed in the business establishment and a first location indicator indicating a first predetermined location in the business establishment where the first product is to be displayed on a first information sheet, thereby producing a first printed information sheet, and to print third product information about a third product to be displayed in the business establishment and a third location indicator indicating a third predetermined location in the business establishment where the third product is to be displayed on a third information sheet, thereby producing a third printed information sheet, where the first printed information sheet is detachably connected to the third printed information sheet. The one or more printers also may be configured to print second product information about a second product to be displayed in the business establishment and a second location indicator indicating a second predetermined location in the business establishment where the second product is to be displayed on a second information sheet, thereby producing a second printed information sheet, and print fourth product information about a fourth product to be displayed in the business establishment and a fourth location indicator indicating a fourth predetermined location in the business establishment where the fourth product is to be displayed on a fourth information sheet, thereby producing a fourth printed information sheet, where the second printed information sheet is detachably connected to the fourth printed information sheet. In some embodiments, the second predetermined location is immediately adjacent to the first predetermined location in the business establishment, and the fourth predetermined location is immediately adjacent to the third predetermined location in the business establishment. In some embodiments, the first and third printed information sheets are printed on a single multiple product information sheet 18, and the second and fourth printed information sheets are printed on a single multiple product information sheet 20. Those skilled in the art will appreciate the multiple product information sheets may contain 2, 3, 4, 5, 6, 7, 8, 9, 10, or any number of individual printed information sheets (11A, 11B, 11C, 110, etc.).

In an operation 68, the multiple product information sheets 18, 20 may be bound in an order based on the order indicator information printed on the individual printed information sheets based on the planogram information, and/or any combination thereof. For example, the set of printed information sheets may be bound at a same edge (e.g., a top edge) with a glue binding, with a mechanical binding, with a removable adhesive binding, with a nonremovable binding and a tearable strip, and/or by other types of binding.

In some embodiments in which the set of printed information sheets include printed information sheets and blank sheets on a multiple product information sheet, the respective multiple product information sheets may be bound in an order based on location indicator information printed on the individual printed information and based on the planogram information.

In some embodiments, the first printed information sheet related to the first product and detachably connected to the third printed information sheet related to the third product is bound to the second printed information sheet related to the second product and detachably connected to the fourth printed information sheet related to the fourth product to produce the array of the printed information sheets. In some embodiments, the second predetermined location at which the second printed information sheet is to be displayed is immediately adjacent to the first predetermined location in the business establishment at which the first printed information sheet is to be displayed, and the fourth predetermined location at which the fourth printed information sheet is to be displayed is immediately adjacent to the third predetermined location in the business establishment at which the third printed information sheet is to be displayed. In some embodiments, the first printed information sheet and the second printed information sheet form one stack of the array and the third printed information sheet and the fourth printed information sheet form another stack of the array. In some embodiments, the number of printed information sheets in a stack may vary.

In some embodiments, the first, the second, the third and the fourth printed information sheets are printed separately, where the second predetermined location at which the second printed information sheet is to be displayed is immediately adjacent to the first predetermined location in the business establishment at which the first printed information sheet is to be displayed, and the fourth predetermined location at which the fourth printed information sheet is to be displayed is immediately adjacent to the third predetermined location in the business establishment at which the third printed information sheet is to be displayed. The first and the second printed information sheets are bound to form a first stack, and the third and the fourth printed information sheets are bound to form a second stack. In some embodiments, the printed information sheets in a stack may be bound to each other or to the corresponding stack. In some embodiments, the printed information sheets in a stack may be removable from or detachably connected to the corresponding stack. In some embodiments, the number of printed information sheets in a stack may vary. In some embodiments, the first and the second stacks are detachably connected to each other to form the array. In some embodiments, the number of stacks in the array may vary.

In some embodiments, either between operations 64 and 65, or after operation 65, any necessary connectors may be attached to individual printed information sheets. For example, an adhesive may be applied (with a lining and/or other backing) to a first printed information sheet of the stack while a clip may be applied to a second printed information sheet of the same stack. In some examples, a same type of connector may be applied to all of the printed information sheets in a stack. In some embodiments, the first and third printed information sheets are printed on the same multiple product information sheet, and the second and fourth printed information sheets are printed on the same multiple product information sheet. In other embodiments, either before or after operation 64, the individual printed information sheets may be cut to a predetermined length. The predetermined length for an individual printed information sheet may be determined based on information stored at the system 1000 and/or may otherwise be determined. In some embodiments, a first printed information sheet of one stack may be cut to a first predetermined length and a first printed information sheet of another stack may be cut to a second predetermined length different from the first length.

In some embodiments, the printed information sheets may be printed in a manner the same as or similar to the printing of shelf edge labels or strips as described in U.S. Pat. No. 7,287,001, filed Aug. 5, 2002, and incorporated above in its entirety by reference, or in a manner the same as or similar to the printing of strips, as described in U.S. Pat. No. 8,626,613, filed Jan. 10, 2003, and incorporated above in its entirety by reference.

The printed information sheet(s) may be placed adjacent to the product(s) in the corresponding structure at which the product(s) is displayed. In some embodiments, the planogram database 510, product database 520, regulations database, and/or other databases may comprise information related to how the printed information sheet is to be attached to a structure at which the associated product(s) are displayed. Based on the attachment information, the printed information sheet may be die cut to fit into a connector disposed at the structure, may have a connector affixed thereon, and/or may otherwise be made ready to connect to the structure at which the printed information sheet is to be placed. In some embodiments, this operation may be performed before or after the stack and/or array comprising the set of printed information sheets are bound.

FIG. 7 illustrates a flow chart of an exemplary method 70 followed by a business establishment (e.g., by employee, machine, apparatus, and/or other entity) to place the printed information sheets in the business establishment, according to an aspect of the disclosure. In an operation 72, the business establishment may receive an array of printed information sheets. The array may include at least two stacks of printed information sheets detachably connected to each other and each stack of printed information sheets comprising at least a first printed information sheet and a second printed information sheet that are attached to each other or to the stack.

In an operation 74, the business establishment may detach the first stack comprising a plurality of printed information sheets from the array. An individual stack may be detached from the corresponding array by bending the stack away from the remainder of the array (such that the force of bending the stack is greater than the bonding force between the individual stack and the remainder of the array). In some embodiments, the stacks are separable from one another, such as, e.g., by breaking the frangible connection provided between the stacks, or in any other suitable manner. In some embodiments, the stack may be separable from the array as a whole, such as, e.g., by breaking the frangible connection connecting that stack to the array, or in any other suitable manner. In some embodiments, the frangible connection may be configured to be bent back and forth until it breaks or snaps off. In some embodiments, the frangible connection may be configured to be bent in one direction until it breaks. In some embodiments, the frangible connection may include a weakened portion (perforation or slit) that is configured to assist in the snapping. In some embodiments, the stack may be detached from an adjacent stack of the array by breaking all the frangible connections provided between all printed information sheets of the two adjacent stacks. In an embodiment, stacks may be detached from the array with a snapping motion using only a small amount of force. In the event the stacks prove difficult to detach, they can easily be detached by placing the frangible connection on the edge of a hard surface, for example a desk or table, and detaching the stack by pushing down on the stack hanging over the edge of the surface.

In an operation 76, the business establishment may attach the printed information sheets of the first stack to their corresponding structures based on the location indicators provided on the corresponding printed information sheets. The printed information sheets of the first stack are ordered such that the adjacent printed information sheets in the stack are to be displaced at immediately adjacent locations in the business establishment.

In an operation 78, responsive to a determination that all of the printed information sheets of the first stack have been removed and attached to their corresponding structures based on the location indicators provided on the corresponding printed information sheets, the business establishment may detach the second stack from the array.

In an operation 80, the business establishment may attach the printed information sheets of the second stack to their corresponding structures based on the location indicators provided on the corresponding printed information sheets.

The ordered array of printed information sheets can be used to greatly simplify the process of positioning the printed information sheets in their respective locations, and to reduce the cost and labor required to position the printed information sheets. As an example, a business establishment may have multiple aisles displaying multiple products and/ or services for sale (e.g., a grocery store, a big box retail establishment, etc.). The owner of the establishment may wish to place product identifiers, sales identifiers, etc. throughout the store. The system and method of the embodiments described herein can prepare specifically tailored arrays for each business establishment using conventional planogram parameters, together with the specific requirements from the owner/operator of the business establishment.

In an embodiment, the arrays may be arranged to contain at least two ordered stacks, each stack being detachably connected to the adjacent stack in the array. The arrays each may contain a cover page indicating where the respective printed information sheets in each stack are to be positioned in the business establishment. The sheets then can be positioned in the business establishment in a simple and cost-effective manner, as summarized below.

The arrays serve as a road map for the individuals responsible for positioning the information sheets in their respective locations in the business establishment. The stacks can be separated from the array, and the first stack (e.g., on the left or right-hand edge of the array) given to one individual, and the second stack given to a second individual, or multiple stacks may be the responsibility of the same individual. As an example, the first stack may include printed information sheets (e.g., first and third printed information sheets, and so on) that are to be positioned in the first aisle of the business establishment, and the second stack (e.g., the stack on the right hand side of the array) may include printed information sheets (e.g., second and fourth printed information sheets, and so on) that are to be positioned in the second aisle of the business establishment.

Each printed information sheet in the respective stacks then can be arranged such that the top printed information sheet in the first multiple product information sheet is configured to be positioned at a first position in the aisle, e.g., closest to the front of the establishment. This top printed information sheet then can be easily removed from the stack and positioned in its position, as directed by the location indicator. The next printed information sheet in the stack (from the second multiple product information sheet) may be configured to be positioned at a second position in the same aisle, e.g., adjacent and/or near the top printed information sheet. Thus, the next printed information sheet may be easily removed from the stack and positioned in its position, as directed by the location indicator.

This process then continues until the printed information sheets in a stack have all been positioned, and then the top printed information sheet in the adjacent stack can be the immediately subsequent printed information sheet to be positioned in the business establishment. In accordance with the embodiments, all printed information sheets can be readily positioned in a retail establishment in a cost-effective manner.

In addition, implementations of the disclosure may be made in hardware, firmware, software, or any suitable combination thereof. Aspects of the disclosure may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the disclosure, and performing certain actions. However, it will be apparent that such descriptions are merely for convenience and that such actions in fact result from computing devices, processors, controllers, or other devices executing the firmware, software, routines, or instructions.

Embodiments and implementations described herein as including a particular feature, structure, or characteristic, but every aspect or implementation may not necessarily include the particular feature, structure, or characteristic. Further, when a particular feature, structure, or characteristic is described in connection with an embodiment or implementation, it will be understood that such feature, structure, or characteristic may be included in connection with other embodiments or implementations, whether or not explicitly described. Thus, various changes and modifications may be made to the provided description without departing from the scope or spirit of the disclosure. As such, the specification and drawings should be regarded as exemplary only, and the scope of the disclosure to be determined solely by the appended claims.

What is claimed is:

1. An array of printed information sheets to be placed in a business establishment according to store planogram information specifying an order of locations of product placement within the business establishment, the array comprising:
   at least two stacks of printed information sheets detachably connected to each other, each stack of printed information sheets comprising at least a first printed information sheet and a second printed information sheet that are removably attached to each other,
   the first printed information sheet having printed thereon first product information about a first product to be displayed in the business establishment and a first location indicator indicating a first predetermined location in the business establishment where the first printed information sheet is to be displayed, wherein the first predetermined location is specified in the store planogram information; and
   the second printed information sheet having printed thereon second product information about a second product to be displayed in the business establishment and a second location indicator indicating a second predetermined location in the business establishment where the second printed information sheet is to be displayed, wherein the second predetermined location is specified in the store planogram information.

2. The array of printed information sheets of claim 1, wherein the first predetermined location and the second predetermined location in the business establishment each comprises at least one of an aisle identifier, an aisle-side identifier, a bay identifier, a section identifier, or a shelf identifier.

3. The array of printed information sheets of claim 1, wherein the first product information and the second product information each include at least one of a machine readable code, a color, a name of, a price of, a machine readable code corresponding with the price, graphics, a logo, an advertisement, a coupon, a promotion of the at least one associated product, or cross-sell information related to the at least one associated product.

4. The array of printed information sheets of claim 1, wherein the first printed information sheet comprises a first connector configured to attach the first printed information sheet to a first structure in the business establishment, and second printed information sheet comprises a second connector configured to attach the second printed information sheet to a second structure in the business establishment.

5. The array of printed information sheets of claim 1, wherein the first printed information sheet is bound to the second printed information sheet in each stack of printed information sheets.

6. The array of printed information sheets of claim 1, wherein the first printed information sheet is bound by adhesive to the second printed information sheet, wherein the second printed information sheet is adjacent to the first printed information sheet in each stack of printed information sheets.

7. The array of printed information sheets of claim 1, wherein the first printed information sheet is bound by a glue binding at an edge of the first printed information sheet to the other printed information sheets in each stack of printed information sheets.

8. The array of printed information sheets of claim 1, wherein the first printed information sheet and the second printed information sheet are ordered in each stack according to the first predetermined location and the second predetermined location.

9. The array of printed information sheets of claim 1, wherein the second predetermined location is immediately adjacent the first predetermined location in the business establishment.

10. An array of printed information sheets to be placed in a business establishment according to store planogram information specifying an order of locations of product placement within the business establishment, the array comprising:
   at least two stacks of printed information sheets detachably connected to each other, a first stack of printed information sheets comprising at least a first printed information sheet and a second printed information sheet that are attached to the stack, and a second stack of printed information sheets comprising at least a third printed information sheet and a fourth printed information sheet,
   A first multiple product information sheet comprising at least the first printed information sheet having printed thereon first product information about a first product to be displayed in the business establishment and a first location indicator indicating a first predetermined location in the business establishment where the first printed information sheet is to be displayed, and a third printed information sheet having printed thereon third product information about a third product to be displayed in the business establishment and a third location indicator indicating a third predetermined location in the business establishment where the third printed information sheet is to be displayed, wherein the first predetermined location and the third predetermined location are specified in the store planogram information;
   a second multiple product information sheet comprising at least the second printed information sheet having printed thereon second product information about a second product to be displayed in the business establishment and a second location indicator indicating a second predetermined location in the business establishment where the second printed information sheet is to be displayed, and a fourth printed information sheet having printed thereon fourth product information about a fourth product to be displayed in the business establishment and a fourth location indicator indicating a fourth predetermined location in the business establishment where the fourth printed information sheet is to be displayed, wherein the second predetermined location and the fourth predetermined location are specified in the store planogram information;
   wherein the first multiple product information sheet is detachably bound to at least the second multiple product information sheet to form the first and second stacks.

* * * * *